US00RE41076E

(19) United States
(12) Reissued Patent
Chu

(10) Patent Number: US RE41,076 E
(45) Date of Reissued Patent: *Jan. 12, 2010

(54) PASSWORD PROTECTED MODULAR COMPUTER METHOD AND DEVICE

(75) Inventor: William W. Y. Chu, Los Altos, CA (US)

(73) Assignee: Acqis Technology, Inc., Mountain View, CA (US)

( * ) Notice: This patent is subject to a terminal disclaimer.

(21) Appl. No.: 11/517,601

(22) Filed: Sep. 6, 2006

Related U.S. Patent Documents

Reissue of:
(64) Patent No.: 6,321,335
Issued: Nov. 20, 2001
Appl. No.: 09/183,493
Filed: Oct. 30, 1998

(51) Int. Cl.
*G06F 13/14* (2006.01)

(52) U.S. Cl. ..... 726/34; 726/28; 713/183; 455/347; 455/349; 710/101

(58) Field of Classification Search ..... None
See application file for complete search history.

(56) References Cited

U.S. PATENT DOCUMENTS

| | | | |
|---|---|---|---|
| 3,996,585 | A | 12/1976 | Hogan |
| 4,623,964 | A | 11/1986 | Getz et al. |
| 4,700,362 | A | 10/1987 | Todd et al. |

(Continued)

FOREIGN PATENT DOCUMENTS

| | | | |
|---|---|---|---|
| EP | 722138 A1 | | 7/1996 |
| JP | 6-289953 | | 10/1994 |
| WO | WO 92/18924 | * | 10/1992 |
| WO | WO94/00097 | | 1/1994 |
| WO | WO95/13640 | | 5/1995 |
| WO | WO97/00481 | * | 1/1997 |

OTHER PUBLICATIONS

Jesse Berst's Anchor Desk, http://www.zdnet.com/anchordesk/talkback/talkback_56555.html.*

Jesse Berst's Anchor Desk, http://www.zdnet.com/anchordesk/story/story_1504.html.*

Rick Boyd–Merritt, "Upgradable—PC effort takes divergent paths", http://techweb.cmp.com/eet/news/97/949news/effort.html.*

Dirk S. Faegre et al., "CTOS Revealed", http://www.byte.com/art/9412/sec13/art2.htm.*

Kelly Spang, "Component House: Design Technology for PCs in a snap'—NeoSystmes Offers Building Blocks", Computer Reseller News, Apr. 21, 1997, Issue 732, Section: Channel Assembly, http://www.techweb.com/se/directlink.cgi?CRN19970421S0054.*

"Think Modular", PC Magazine, Jun. 10, 1997, wysiwyg://60/http://homezdnet.com/pcmag/issues/1611/pcmg0072.htm.*

Jesse Berst's Anchor Desk, http://www.zdnet.com/anchordesk/talkback/talkback_56555.html, (Dec. 5, 1997), 1 page.

(Continued)

*Primary Examiner*—Ponnoreay Pich
(74) *Attorney, Agent, or Firm*—Cooley Godward Kronish LLP

(57) ABSTRACT

A method and device for securing a removable Attached Computer Module ("ACM") 10. ACM 10 inserts into a Computer Module Bay ("CMB") 40 within a peripheral console to form a functional computer such as a desktop computer or portable computer. The present ACM 10 includes a locking system, which includes hardware and software 600, 700, to prevent accidental removal or theft of the ACM from the peripheral console. While ACM is in transit, further security is necessary against illegal or unauthorized use. If ACM contains confidential data, a high security method is needed to safeguard against theft.

35 Claims, 17 Drawing Sheets

U.S. PATENT DOCUMENTS

| | | | | | |
|---|---|---|---|---|---|
| 4,769,764 | A | | 9/1988 | Levanon | |
| 4,872,091 | A | | 10/1989 | Maniwa et al. | |
| 4,890,282 | A | | 12/1989 | Lambert et al. | |
| 4,918,572 | A | | 4/1990 | Tarver et al. | |
| 4,939,735 | A | | 7/1990 | Fredericks et al. | |
| 5,056,141 | A | | 10/1991 | Dyke | |
| 5,086,499 | A | | 2/1992 | Mutone | |
| 5,103,446 | A | * | 4/1992 | Fischer | 370/236 |
| 5,191,581 | A | * | 3/1993 | Woodbury et al. | 370/364 |
| 5,251,097 | A | | 10/1993 | Simmons et al. | |
| 5,278,509 | A | | 1/1994 | Haynes et al. | |
| 5,278,730 | A | | 1/1994 | Kikinis | |
| 5,293,497 | A | | 3/1994 | Free | |
| 5,311,397 | A | | 5/1994 | Harshberger et al. | |
| 5,317,477 | A | | 5/1994 | Gillett | |
| 5,319,771 | A | | 6/1994 | Takeda | |
| 5,331,509 | A | | 7/1994 | Kikinis | |
| 5,355,391 | A | | 10/1994 | Horowitz et al. | |
| 5,428,806 | A | | 6/1995 | Pocrass | |
| 5,436,857 | A | | 7/1995 | Nelson et al. | |
| 5,463,742 | A | | 10/1995 | Kobayashi | |
| 5,519,843 | A | * | 5/1996 | Moran et al. | 711/103 |
| 5,539,616 | A | * | 7/1996 | Kikinis | 361/686 |
| 5,550,710 | A | | 8/1996 | Rahamim et al. | |
| 5,550,861 | A | | 8/1996 | Chan et al. | |
| 5,572,441 | A | * | 11/1996 | Boie | 307/109 |
| 5,578,940 | A | | 11/1996 | Dillon | |
| 5,600,800 | A | | 2/1997 | Kikinis et al. | |
| 5,603,044 | A | | 2/1997 | Annapareddy et al. | |
| 5,606,717 | A | | 2/1997 | Farmwald et al. | |
| 5,608,608 | A | | 3/1997 | Flint et al. | |
| 5,623,637 | A | | 4/1997 | Jones et al. | |
| 5,630,057 | A | | 5/1997 | Hait | |
| 5,638,521 | A | | 6/1997 | Buchala et al. | |
| 5,640,302 | A | | 6/1997 | Kikinis | |
| 5,648,762 | A | * | 7/1997 | Ichimura et al. | 726/34 |
| 5,659,773 | A | | 8/1997 | Huynh et al. | |
| 5,663,661 | A | | 9/1997 | Dillon et al. | |
| 5,673,174 | A | * | 9/1997 | Hamirani | 361/686 |
| 5,680,126 | A | | 10/1997 | Kikinis | |
| 5,689,654 | A | | 11/1997 | Kikinis | |
| 5,721,837 | A | | 2/1998 | Kikinis | |
| 5,721,842 | A | | 2/1998 | Beasley et al. | |
| 5,745,733 | A | | 4/1998 | Robinson | |
| 5,751,711 | A | * | 5/1998 | Sakaue | 370/431 |
| 5,752,080 | A | | 5/1998 | Ryan | |
| 5,764,924 | A | | 6/1998 | Hong | |
| 5,774,704 | A | * | 6/1998 | Williams | 713/501 |
| 5,795,228 | A | | 8/1998 | Trumbull | |
| 5,809,538 | A | | 9/1998 | Pollmann | |
| 5,815,681 | A | | 9/1998 | Kikinis | |
| 5,819,050 | A | | 10/1998 | Boehling et al. | |
| 5,826,048 | A | | 10/1998 | Dempsey et al. | |
| 5,838,932 | A | * | 11/1998 | Alzien | 710/314 |
| 5,848,249 | A | | 12/1998 | Garbus | |
| 5,859,669 | A | | 1/1999 | Prentice | |
| 5,862,381 | A | | 1/1999 | Advani et al. | |
| 5,907,566 | A | | 5/1999 | Benson et al. | |
| 5,933,609 | A | * | 8/1999 | Walker et al. | 710/304 |
| 5,941,965 | A | | 8/1999 | Moroz | |
| 5,960,213 | A | | 8/1999 | Wilson | |
| 5,948,047 | A | | 9/1999 | Jenkins et al. | |
| 5,968,144 | A | | 10/1999 | Walker et al. | |
| 5,971,804 | A | | 10/1999 | Gallagher et al. | |
| 5,977,989 | A | | 11/1999 | Lee et al. | |
| 5,978,919 | A | | 11/1999 | Doi et al. | |
| 5,982,363 | A | | 11/1999 | Naift | |
| 5,991,163 | A | | 11/1999 | Marconi et al. | |
| 5,991,844 | A | | 12/1999 | Khosrowpour | |
| 5,999,952 | A | | 12/1999 | Jenkins et al. | |
| 6,002,442 | A | | 12/1999 | Li et al. | |
| 6,003,105 | A | | 12/1999 | Vicard et al. | |
| 6,006,243 | A | * | 12/1999 | Karidis | 708/100 |
| 6,009,488 | A | | 12/1999 | Kavipurapu | |
| 6,011,546 | A | | 1/2000 | Bertram | |
| 6,012,145 | A | * | 1/2000 | Mathers et al. | 726/17 |
| 6,016,252 | A | | 1/2000 | Pignolet et al. | |
| 6,028,643 | A | | 2/2000 | Jordan et al. | |
| 6,029,183 | A | | 2/2000 | Jenkins et al. | |
| 6,038,621 | A | | 3/2000 | Gale et al. | |
| 6,040,792 | A | | 3/2000 | Watson et al. | |
| 6,046,571 | A | * | 4/2000 | Bovio et al. | 320/113 |
| 6,052,513 | A | | 4/2000 | McLaren | |
| 6,069,615 | A | | 5/2000 | Abraham et al. | |
| 6,070,214 | A | | 5/2000 | Ahern | |
| 6,088,224 | A | | 7/2000 | Gallagher et al. | |
| 6,088,752 | A | | 7/2000 | Ahern | |
| 6,104,921 | A | * | 8/2000 | Cosley et al. | 455/349 |
| 6,157,534 | A | | 12/2000 | Gallagher et al. | |
| 6,163,464 | A | | 12/2000 | Ishibashi et al. | |
| 6,175,490 | B1 | | 1/2001 | Papa et al. | |
| 6,202,169 | B1 | | 3/2001 | Razzaghe-Asrafi et al. | |
| 6,208,522 | B1 | | 3/2001 | Manweiler et al. | |
| 6,216,185 | B1 | * | 4/2001 | Chu | |
| 6,256,689 | B1 | * | 7/2001 | Khosrowpour | 710/300 |
| 6,260,155 | B1 | | 7/2001 | Dellacona | |
| 6,266,539 | B1 | * | 7/2001 | Pardo | 455/556.2 |
| 6,289,376 | B1 | | 9/2001 | Taylor et al. | |
| 6,304,895 | B1 | | 10/2001 | Schneider et al. | |
| 6,311,268 | B1 | | 10/2001 | Chu | |
| 6,314,522 | B1 | | 11/2001 | Chu et al. | |
| 6,317,329 | B1 | | 11/2001 | Dowdy et al. | |
| 6,321,335 | B1 | | 11/2001 | Chu | |
| 6,332,180 | B1 | | 12/2001 | Kauffman et al. | |
| 6,345,330 | B2 | | 2/2002 | Chu | |
| 6,366,951 | B1 | | 4/2002 | Schmidt | |
| 6,378,009 | B1 | | 4/2002 | Pinkston, II et al. | |
| 6,381,602 | B1 | | 4/2002 | Shoroff et al. | |
| 6,393,561 | B1 | | 5/2002 | Hagiwara et al. | |
| 6,401,124 | B1 | | 6/2002 | Yang et al. | |
| 6,425,033 | B1 | | 7/2002 | Conway et al. | |
| 6,452,789 | B1 | | 9/2002 | Pallotti et al. | |
| 6,452,790 | B1 | | 9/2002 | Chu et al. | |
| 6,453,344 | B1 | | 9/2002 | Ellsworth | |
| 6,496,361 | B2 | | 12/2002 | Kim et al. | |
| 6,549,966 | B1 | | 4/2003 | Dickens et al. | |
| 6,564,274 | B1 | | 5/2003 | Heath et al. | |
| 6,643,777 | B1 | | 11/2003 | Chu | |
| 6,718,415 | B1 | | 4/2004 | Chu | |
| 6,725,317 | B1 | | 4/2004 | Bouchier et al. | |
| 7,099,981 | B2 | | 8/2006 | Chu | |
| 7,146,446 | B2 | | 12/2006 | Chu | |
| 2001/0011312 | A1 | * | 8/2001 | Chu | 710/64 |

OTHER PUBLICATIONS

Jesse Berst's Anchor Desk, http://www.zdnet.com/anchordesk/story/story_1504.html, (Dec. 5, 1997), pp. 1–3.

Boyd–Merritt, Rick, "Ungradeable–PC effort takes divergent paths", http://techweb.cmp.com/eet/news/97/949news.effort.html, (Jul. 31, 1998) pp. 1–3.

Faegre, Dirk S. et al., "CTOS Revealed", Core Technologies, http://www.byte–.com/art/9412/sec13/art2.htm, (Dec. 1994) pp. 1–6.

Eversys Corporation, "Eversys System 8000 Consolidated Network Server Market and Product Overview," Slide Presentation downloaded from <http://eversys.com>, (product to be released Mar. 1, 1997) 20 pages, unknown date.

Synder, Joel, "Better Management through Consolidation," pp. 1–6 downloaded from the internet @ http://www.opus1.com/www/jms/nw–con–0818rev.html. (Aug. 18, 1997).

U.S. Appl. No. 12/322,858, filed Feb. 5, 2009, William W. Y. Chu.

Agerwala, T., "SP2 System Architecture," IBM Systems Joural, vol. 34, No. 2, pp. 152–184 (1995).

Bernal, Carlos, product brochure entitled: "PowerSMP Series 4000" (Mar. 1998) <<http://www.winnetmag.com/Windows/Article/ArticleID/3095/13095.html, downloaded from web on Jun. 22, 2004, 2 pgs.

CETIA Brochure "CETIA Powerengine CVME 603e", pp. 1–6 downloaded from the internet at. http://www.cetia.com/ProductAddOns/wp–47–01.pdf on Feb. 15, 2006.

Cragle, Jonathan, "Density System 1100", May 1999) <<http://www.winnetmag.com/Windows/Article/ArticleID/5199/5199.html>>, downloaded from web on Jun. 21, 2004, 3 pgs.

Crystal Advertisement for "Rackmount Computers", (@2000–2004) <<http:/www.crystalpc.com/products/roservers.asp>>, downloaded from web on Jun. 17, 2004, 8 pgs.

Cubix, "Click on the front panel that matches your system", (@2000) <<http://64.173.211.7/support/techinfo/system/density/density.htm>>, downloaded from web on Jun. 22, 2004, 1 pg.

Cubix, "DP 6200 'D' Series Plug–in Computers" <<http://64.173.211.7/support/techinfo/bc/dp/6200d/Intro.htm>>, downloaded from web on Jun. 22, 2004, 2 pgs.

Cubix, "Installing DP or SP Series Boards" (@2000) <<http://64.173.211.7/support/techinfo/system/density/info/pic–inst.htm>>, downloaded from web on Jun. 22, 2004, 2 pgs.

Cubix, "Powering On/Off or Resetting Plug–in Computers in an Density System", (@2000) <<http://64.173.211.7/support/techinfo/system/density/info/power.htm>>, downloaded from web on Jun. 22, 2004, 2 pgs.

Cubix, "Multiplexing Video, Keyboard & Mouse with Multiple Density Systems", (@2000) <<http://64.173.211.7/support/techinfo/system/density/info/vkm–mux.htm>>, downloaded from web on Jun. 22, 2004, 2 pgs.

Cubix Product Brochure entitled, "Density System", (@2000) <<http://64.173.211.7/support/techinfo/system/density/density10.htm>> downloaded from web on Jun. 22, 2004, 3 pgs.

Cubix Product Brochure entitled, "Density System, Technical Specifications", (@2000) <http://64.173.211.7/support/techinfo/system/density/info/spec.htm>> downloaded from web on Jun. 22, 2004, 2 pgs.

Cubix Product Manual entitled; "Density System", Chapter 1–Introduction, (@2000) <<http://64.173.211.7/support/techinfo/manuals/density/Chap–1.htm>>downloaded from web on Jun. 22, 2004, 5 pgs.

Cubix Product Manual entitled, "Density System", Chapter2–Installation, (@2000) <<http://64.173.211.7/support/techiknfo/manuals/density/Chap–2.htm>> downloaded from web on Jun. 22, 2004, 9 pgs.

Cubix Product Manual entitled, "Density System", Chapter 3–Operation, (@2000), <<http://64.173.211.7/support/techinfo/manuals/density/Chap–3.htm>> downloaded from web on Jun. 22, 2004, 4 pgs.

Cubix, "Click on the front panel that matches your system", (@2000) <<http://64.173.211.7/support/techinfo/system/density/desity.htm>>, downloaded from web on Jun. 22, 2004, 1 pg.

Cubix Product Manual entitled, "Density System," Chapter 4–Maintenance and Repair, (@2000) <<http://64.173.211.7/support/techinfo/manuals/density/Chap4–htm>> downloaded from web on Jun. 22, 2004, 5 pgs.

Cubix, "SP 5200XS Series Plug–in Computers", (@2000) <<http://64.173.211.7/support/techinfo/bc/sp5200xs/intro.htm>>, downloaded from web on Jun. 22, 2004, 2 pgs.

Cubix, "SP 5200XS Series Technical Specifications", (@2000) <<http://64.173.211.7/support/techinfo/bc/sp5200xs/spec.htm>>, downloaded from web on Jun. 22, 2004, 2 pgs.

Cubix, "SP 5200 Series" Chapter 1–Introduction, (@2000) <<http://64.173.211.7/support/techinfo/manuals/sp5200/chap–2.htm>>, downloaded from web on Jun. 22, 2004, 3 pgs.

Cubix, "SP 5200 Series" Chapter 2–Switches & Jumpers, (@2000) <<http://64.173.211.7/support/techinfo/manuals/sp5200/chap–3.htm>>, downloaded from web on Jun. 22, 2004, 3 pgs.

Cubix, "SP 5200 Series" Chapter3–Installation, (@2000) <<http://64.173.211.7/support/techinfo/manuals/sp5200/chap–4.htm>>, downloaded from web on Jun. 22, 2004, 4 pgs.

Cubix, "SP 5200 Series" Chapter4–Technical Reference, (@2000) <<http://64.173.211.7/support/techinfo/manuals/sp5200xs/chap–1.htm>>, downloaded from web on Jun. 22, 2004, 3 pgs.

Cubix, "What are Groups?", (@2000) <<http://64.173.211.7/support/techinfo/system/density/info/groups.htm>>, downloaded from web on Jun. 22, 2004, 3 pgs.

eBay Advertisement for "Total IT Group Network Engines", <<http://cgi.ebay.com/we/eBayISAPI.dll?ViewItem&Item=5706388046&sspagename+STRK%3AMDBI%3AMEBI3AIT&rd=1>>, Downloaded from web on Jun. 25, 2004, 1 pg.

"Features Chart", (Feb. 1, 1997) <<http://www.lantimes.com/testing/97feb/702b072a.html>>, downloaded from web on Jun. 23, 2004, 3 pgs.

Feldman, Jonathan, "Rack Steady: The Four Rack–Mounted Servers That Rocked Our Network", <<http://www.networkcomputing.com/shared/printArticle.jhtml?article=910/910r3side1.htm . . . >>, Jun. 23, 2004, 3 pgs.

Fetters, Dave, "Cubix High–Density Server Leads the Way With Standout Management Software", (Feb. 8, 1999) <<http://www.nwc.com/shared/printArticle.jhtml?article=/1003/1003r3full.html&pub=nwc>>, downloaded from web on Jun. 23, 2004, 5 pgs.

Gardner, Michael and Null, Christopher, "A Server Condominium", <<htp://www.lantimes.com/testing/98jun/806a042a.html>>, Jun. 23, 2004, 3 pgs.

Harrison, Dave, "VME in the Military: The M1A2 Main Battle Tank Upgrade Relies on COTS VME" <<http://www.dy4.com>>>, (Feb 9, 1998), pp. 1–34.

Internet Telephony Roundup, "Industrial Computer", <<http://www.tmcnet.com/articles/itmag/0499/0499roundup.htm>>, downloaded from web on Jun. 23, 2004, 5 pgs.

Kelly Spang, "Component House: Design Technology for PCs in a snap'–NeoSystmes Offers Building Blocks", Computer Reseller News, Apr. 21, 1997, Issue 732, Section: Channel Assembly, http://www.techweb.com/se/directlink.cgi?CRN19970421S0054.
Microsoft Cluster Service Center, "MSCS Basics," Downloaded from <http://www.nwnetworks.com/mscsbasics.htm>>, Feb. 7, 2005, 4 pages total.
MPL Brochure "1st Rugged All in One Industrial 486FDX–133 MHz PC" pp. 1–2, downloaded from the internet at. http://www.mpl.ch/DOCs/ds–48600.pdf on Feb. 15, 2006.
MPL Brochure "IPM 486 Brochure/IPM5 User manual" pp. 1–9 downloaded from the internet at http://www.mpl.ch/DOCs/u48600xd.pdf on Feb. 15, 2006.
MPL, "The First Rugged All–in–One Industrial 486FDX–133 MHz PC" IPM 486 Brochure/IPM5 User manual, 1998, pp. 1–52.
Press Release: Hiawatha, Iowa, (Mar. 1, 1997) entitled "Crystal Group Products Offer Industrial PCs with Built–in Flexibility", <<http://www.crystalpc.com/news/pressreleases/prodpr.asp>>, downloaded from web on May 14, 2004, 2 pgs.
Press Release: Kanata, Ontario, Canada, (Apr. 1998) entitled "Enhanced COTS SBC from DY 4 Systems features 166MHz Pentium™ Processor" <<http://www.realtimeinfo.be/VPR/layout/display/pr.asp?/pr.asp?PRID=363>>, 2 pgs.
Product Brochure entitled "SVME/DM–192 Pentium® II Single Board Computer" ( Jun. 1999) pp. 1–9.
Product Brochure entitled "System 8000", <<http://www.bomara.com/Eversys/briefDefault.htm>>, downloaded from web on Jun. 22, 2004, 4 pgs.
Product Brochure entitled "ERS/FT II System", (@2000) <<http://64.173.211.7/support/techinfo/system/ersft2/ersft2.htm>>, downloaded from web on Jun. 22, 2004, 4 pgs.
Product Manual entitled: "ERS II and ERS/FT II," Chap. 6, Component Installation, <<http://64.173.211.7/support/techinfo/manuals/ers2/ers2–c6.htm>>, downloaded from web on Jun. 22, 2004, 18 pgs.
Product Manual entitled "ERS II and ERS/FT II", Chap. 3, System Components, <<http://64.173.211.7/support/techinfo/manuals/ers2/ers2–c3.htm>>, downloaded from web on Jun. 22, 2004, 21 pgs.
"SQL Server and NT Cluster Manager Availability Demo," Microsoft Server Programmer Developers Conference, Nov. 1996, 15 pages total.
"Think Modular", PC Magazine, Jun. 10, 1997, wysiwyg://60/http://homezdnet.com/pcmag/issues/1611/pcmg0072.htm.
Williams, Dennis, "ChatCom Inc. Chatterbox", (Feb. 17, 1997) <<http://www.lantimes.com/testing/97feb/702b066a.html>> downloaded from web on Jun. 23, 2004, 3 pgs.
Williams, Dennis, "Consolidated Servers", (Feb. 17, 1997) <<http://www.lantimes.com/testing/97compare/pcconsol.html>> downloaded from web on Jun. 23, 2004, 2 pgs.
Williams, Dennis, "Cubix Corp. ERS/FT II", (Feb. 17, 1997) <<http://www.lantimes.com/testing/97feb/702b068b.html>> downloaded from web on Jun. 23, 2004, 4 pgs.
Windows Magazine, "Cubix PowerSMP Series 4000", Nov. 1997, <http://<www.techweb.com/winmag/library/1997/1101/ntent008.htm>> downloaded from the web on Jun. 22, 2004, pg. NT07.
Williams, Dennis "EVERSYS Corp. System 8000", Feb. 17, 1997) <<http://ww.lantimes.com/testing/97feb/702b070b.html>> downloaded from web on Jun. 22, 2004, 4 pgs.
Williams, Dennis, "Executive Summary: Consolidate Now", (Feb. 17, 1997) <<http://ww.lantimes.com/testing/97feb/702b064a.html>> downloaded from web on Jun. 23, 2004, 2 pgs.
Williams, Dennis, "Top Scores for Useability and Openness", (Feb. 17, 1997) <<http://www.lantimes.com/testing/97feb/702b064a.html>> downloaded from web on Jun. 23, 2004, 2 pgs.

* cited by examiner

PASSWORD PROTECTED MODULAR COMPUTER METHOD AND DEVICE

Matter enclosed in heavy brackets [ ] appears in the original patent but forms no part of this reissue specification; matter printed in italics indicates the additions made by reissue.

CROSS REFERENCE TO RELATED APPLICATIONS

[The following two commonly-owned copending applications, including this one, are being filed concurrently and the other one is hereby incorporated by reference in their entirety for all purposes:] *Notice: More than one reissue application has been filed for the reissue of U.S. Pat. No. 6,321,335. The reissue applications are application Ser. No. 10/963,825 filed Oct. 12, 2004, application Ser. No. 11/474,256 filed Jun. 23, 2006, and application Ser. No. 11/517,601, filed Sep. 6, 2006 (the present application), which is a continuation reissue of U.S. Pat. No. 6,321,335.*

1. U.S. patent application Ser. No. 09/183,816, William W. Y. Chu, entitled "Modular Computer Security Method and Device", and 2. U.S. patent application Ser. No. 09/183,493, William W. Y. Chu, entitled "Password Protected Modular Computer Method and Device".

BACKGROUND OF THE INVENTION

The present invention relates to computing devices. More particularly, the present invention provides a method and device for securing a personal computer or set-top box using password protection techniques. Merely by way of example, the present invention is applied to a modular computing environment for desk top computers, but it will be recognized that the invention has a much wider range of applicability. It can be applied to a server as well as other portable or modular computing applications.

Many desktop or personal computers, which are commonly termed PCs, have been around and used for over ten years. The PCs often come with state-of-art microprocessors such as the Intel Pentium™ microprocessor chips. They also include a hard or fixed disk drive such as memory in the giga-bit range. Additionally, the PCs often include a random access memory integrated circuit device such as a dynamic random access memory device, which is commonly termed DRAM. The DRAM devices now provide up to millions of memory cells (i.e., mega-bit) on a single slice of silicon. PCs also include a high resolution display such as cathode ray tubes or CRTs. In most cases, the CRTs are at least 15 inches or 17 inches or 20 inches in diameter. High resolution flat panel displays are also used with PCs.

Many external or peripheral devices can be used with the PCs. Among others, these peripheral devices include mass storage devices such as a Zip™ Drive product sold by Iomega Corporation of Utah. Other storage devices include external hard drives, tape drives, and others. Additional devices include communication devices such as a modem, which can be used to link the PC to a wide area network of computers such as the Internet. Furthermore, the PC can include output devices such as a printer and other output means. Moreover, the PC can include special audio output devices such as speakers the like.

PCs also have easy to use keyboards, mouse input devices, and the like. The keyboard is generally configured similar to a typewriter format. The keyboard also has the length and width for easily inputting information by way of keys to the computer. The mouse also has a sufficient size and shape to easily move a curser on the display from one location to another location.

Other types of computing devices include portable computing devices such as "laptop" computers and the like. Although somewhat successful, laptop computers have many limitations. These computing devices have poor display technology. In fact, these devices often have a smaller flat panel display that has poor viewing characteristics. Additionally, these devices also have poor input devices such as smaller keyboards and the like. Furthermore, these devices have limited common platforms to transfer information to and from these devices and other devices such as PCs.

Up to now, there has been little common ground between these platforms including the PCs and laptops in terms of upgrading, ease-of-use, cost, performance, and the like. Many differences between these platforms, probably somewhat intentional, has benefited computer manufacturers at the cost of consumers. A drawback to having two separate computers is that the user must often purchase both the desktop and laptop to have "total" computing power, where the desktop serves as a "regular" computer and the laptop serves as a "portable" computer. Purchasing both computers is often costly and runs "thousands" of dollars. The user also wastes a significant amount of time transferring software and data between the two types of computers. For example, the user must often couple the portable computer to a local area network (i.e., LAN), to a serial port with a modem and then manually transfer over files and data between the desktop and the portable computer. Alternatively, the user often must use floppy disks to "zip" up files and programs that exceed the storage capacity of conventional floppy disks, and transfer the floppy disk data manually.

Another drawback with the current model of separate portable and desktop computer is that the user has to spend money to buy components and peripherals the are duplicated in at least one of these computers. For example, both the desktop and portable computers typically include hard disk drives, floppy drives, CD-ROMs, computer memory, host processors, graphics accelerators, and the like. Because program software and supporting programs generally must be installed upon both hard drives in order for the user to operate programs on the road and in the office, hard disk space is often wasted.

One approach to reduce some of these drawbacks has been the use of a docking station with a portable computer. Here, the user has the portable computer for "on the road" use and a docking station that houses the portable computer for office use. The docking station typically includes a separate monitor, keyboard, mouse, and the like and is generally incompatible with other desktop PCs. The docking station is also generally not compatible with portable computers of other vendors. Another drawback to this approach is that the portable computer typically has lower performance and functionality than a conventional desktop PC. For example, the processor of the portable is typically much slower than processors in dedicated desktop computers, because of power consumption and heat dissipation concerns. As an example, it is noted that at the time of drafting of the present application, some top-of-the-line desktops include 400 MHz processors, whereas top-of-the-line notebook computers include 266 MHz processors.

Another drawback to the docking station approach is that the typical cost of portable computers with docking stations can approach the cost of having a separate portable computer and a separate desktop computer. Further, as noted above, because different vendors of portable computers have proprietary docking stations, computer users are held captive by their investments and must rely upon the particular computer vendor for future upgrades, support, and the like.

Thus what is needed are computer systems that provide reduced user investment in redundant computer components and provide a variable level of performance based upon computer configuration.

SUMMARY OF THE INVENTION

According to the present invention, a technique including a method and device for securing a computer module using a password in a computer system is provided. In an exemplary embodiment, the present invention provides a security system for an attached computer module ("ACM"). In an embodiment, the ACM inserts into a Computer Module Bay (CMB) within a peripheral console to form a functional computer.

In a specific embodiment, the present invention provides a computer module. The computer module has an enclosure that is insertable into a console. The module also has a central processing unit (i.e., integrated circuit chip) in the enclosure. The module has a hard disk drive in the enclosure, where the hard disk drive is coupled to the central processing unit. The module further has a programmable memory device in the enclosure, where the programmable memory device can be configurable to store a password for preventing a possibility of unauthorized use of the hard disk drive and/or other module elements. The stored password can be any suitable key strokes that a user can change from time to time. In a further embodiment, the present invention provides a permanent password or user identification code stored in flash memory, which also can be in the processing unit, or other integrated circuit element. The permanent password or user identification code is designed to provide a permanent "finger print" on the attached computer module.

In a specific embodiment, the present invention provides a variety of methods. In one embodiment, the present invention provides a method for operating a computer system such as a modular computer system and others. The method includes inserting an attached computer module ("ACM") into a bay of a modular computer system. The ACM has a microprocessor unit (e.g., microcontroller, microprocessor) coupled to a mass memory storage device (e.g., hard disk). The method also includes applying power to the computer system and the ACM to execute a security program, which is stored in the mass memory storage device. The method also includes prompting for a user password from a user on a display (e.g., flat panel, CRT). In a further embodiment, the present method includes a step of reading a permanent password or user identification code stored in flash memory, or other integrated circuit element. The permanent password or user identification code provides a permanent finger print on the attached computer module. The present invention includes a variety of these methods that can be implemented in computer codes, for example, as well as hardware.

Numerous benefits are achieved using the present invention over previously existing techniques. The present invention provides mechanical and electrical security systems to prevent theft or unauthorized use of the computer system in a specific embodiment. Additionally, the present invention substantially prevents accidental removal of the ACM from the console. In some embodiments, the present invention prevents illegal or unauthorized use during transmit. The present invention is also implemented using conventional technologies that can be provided in the present computer system in an easy and efficient manner. Depending upon the embodiment, one or more of these benefits can be available. These and other advantages or benefits are described throughout the present specification and are described more particularly below.

These and other embodiments of the present invention, as well as its advantages and features, are described in more detail in conjunction with the text below and attached FIGS.

BRIEF DESCRIPTION OF THE DRAWINGS

*FIG. 16 is a detailed block diagram of another embodiment of the HIC of the present invention.*

DESCRIPTION OF SPECIFIC EMBODIMENTS

I. System Hardware

Figure 1:
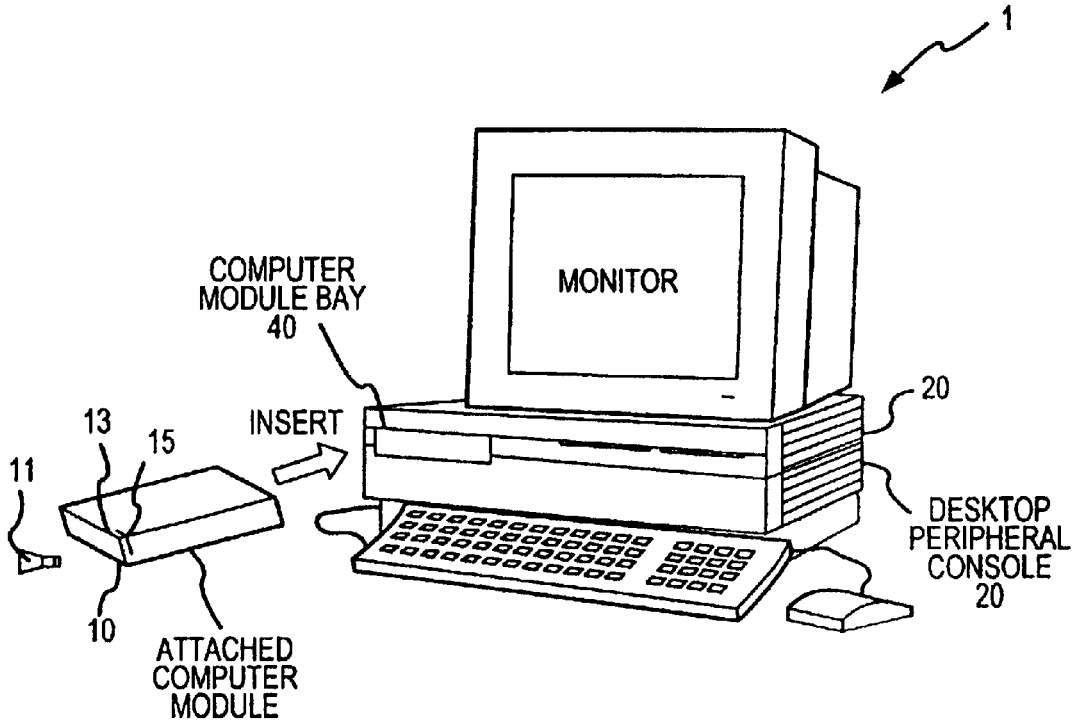
FIG. 1 is a simplified diagram of a computer system according to an embodiment of the present invention.

FIG. 1 is a simplified diagram of a computer system 1 according to an embodiment of the present invention. This diagram is merely an illustration and should not limit the scope of the claims herein. One of ordinary skill in the art would recognize other variations, modifications, and alternatives. The computer system 1 includes an attached computer module (i.e., ACM) 10, a desktop console 20, among other elements. The computer system is modular and has a variety of components that are removable. Some of these components (or modules) can be used in different computers, workstations, computerized television sets, and portable or laptop units.

In the present embodiment, ACM 10 includes computer components, as will be described below, including a central processing unit ("CPU"), IDE controller, hard disk drive, computer memory, and the like. The computer module bay (i.e., CMB) 40 is an opening or slot in the desktop console. The CMB houses the ACM and provides communication to and from the ACM. The CMB also provides mechanical protection and support to ACM 10. The CMB has a mechanical alignment mechanism for mating a portion of the ACM to the console. The CMB further has thermal heat dissipation sinks, electrical connection mechanisms, and the like. Some details of the ACM can be found in co-pending patent application Nos. 09/149,882 and 09/149,548 filed Sep. 8, 1998, commonly assigned, and hereby incorporated by reference for all purposes.

In a preferred embodiment, the present system has a security system, which includes a mechanical locking system, an electrical locking system, and others. The mechanical locking system includes at least a key 11. The key 11 mates with key hole 13 in a lock, which provides a mechanical latch 15 in a closed position. The mechanical latch, in the closed position, mates and interlocks the ACM to the computer module bay. The mechanical latch, which also has an open position, allows the ACM to be removed from the computer module bay. Further details of the mechanical locking system are shown in the Fig. below.

Figure 2:
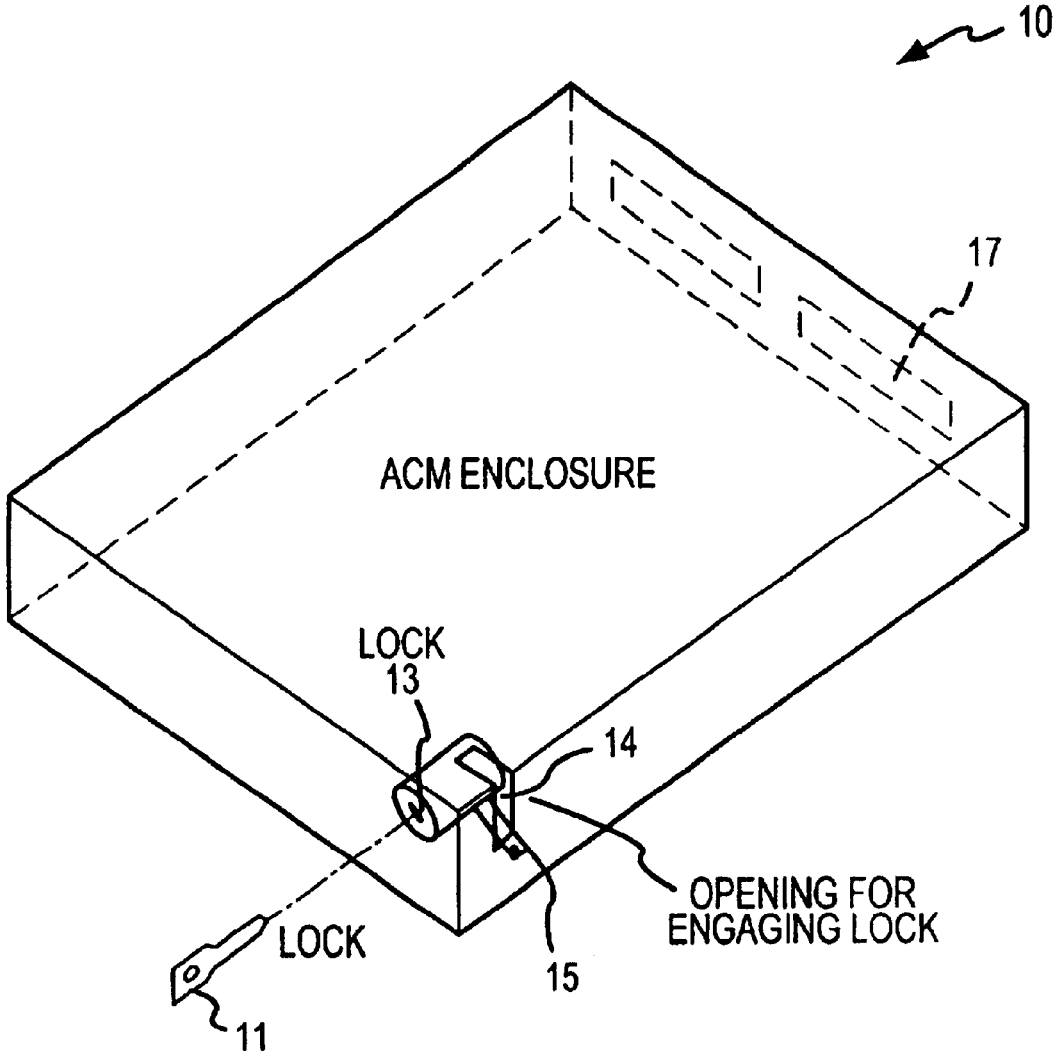
FIG. 2 is a simplified diagram of a computer module according to an embodiment of the present invention.

FIG. 2 is a simplified diagram of a computer module 10 according to an embodiment of the present invention. This diagram is merely an illustration and should not limit the scope of the claims herein. One of ordinary skill in the art would recognize other variations, modifications, and alternatives. Some of the reference numerals are similar to the previous Fig. for easy reading. The computer module 10 includes key 11, which is insertable into keyhole 13 of the lock. The lock has at least two position, including a latched or closed position and an unlatched or open position. The latched position secures the ACM to the computer module bay. The unlatched or open position allows the ACM to be inserted into or removed from the computer bay module. As shown, the ACM also has a slot or opening 14, which allows the latch to move into and out of the ACM. The ACM also has openings 17 in the backside for an electrical and/or mechanical connection to the computer module bay, which is connected to the console.

Figure 3:
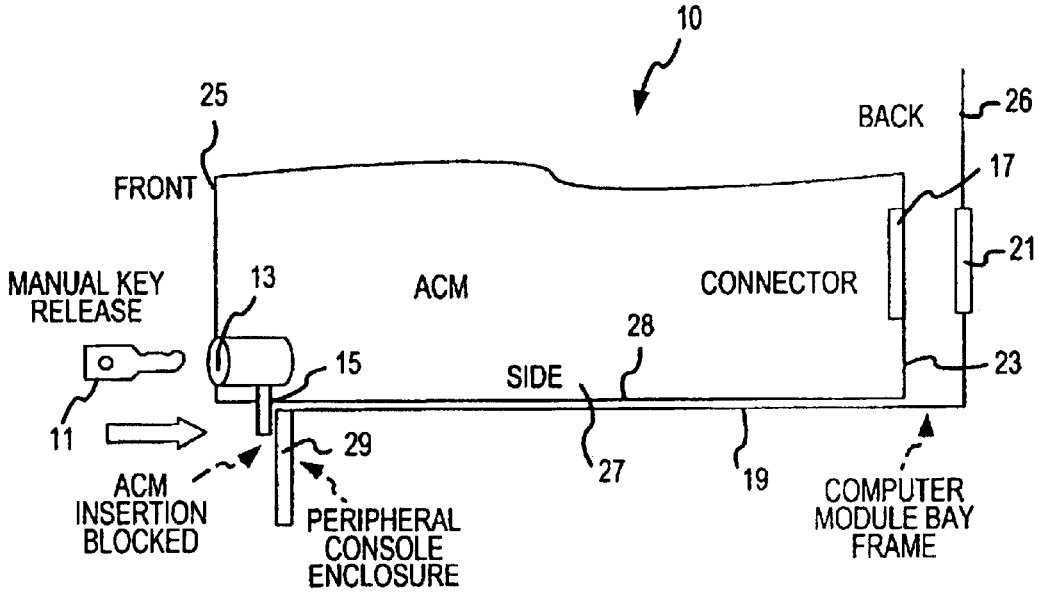
FIG. 3 is a simplified side-view diagram of a computer module according to an embodiment of the present invention.

FIG. 3 is a simplified side-view diagram of a computer module according to an embodiment of the present invention. This diagram is merely an illustration and should not limit the scope of the claims herein. One of ordinary skill in the art would recognize other variations, modifications, and alternatives. Some of the reference numerals are similar to the previous FIG. for easy reading. As shown, the ACM module inserts into the computer module bay frame 19, which is in the console. A side 27 and a bottom 19 of ACM slide and fit firmly into the computer module bay frame, which has at least a bottom portion 19 and back portion 26. A backside 23 of the ACM faces backside 26 of the frame. ACM also has a front-side or face 25 that houses the lock and exposes the keyhole 13 to a user. The key 11 is insertable from the face into the keyhole.

As the ACM inserts into the frame, connector 17 couples and inserts into connector 21. Connector 17 electrically and mechanically interface elements of the ACM to the console through connector 21. Latch 14 should be moved away from the bottom side 19 of the module bay frame before inserting the ACM into the frame. Once the ACM is inserted fully into the frame, latch 15 is placed in a closed or lock position, where it keeps the ACM firmly in place. That is, latch 15 biases against a backside portion 29 of the ACM enclosure to hold the ACM in place, where the connector 17 firmly engages, electrically and mechanically, with connector 21. To remove the ACM, latch 15 is moved away or opened from the back side portion of the ACM enclosure. ACM is manually pulled out of the computer module bay frame, where connector 17 disengages with connector 21. As shown, the key 11 is used to selectively move the latch in the open or locked position to secure the ACM into the frame module.

In most embodiments, the ACM includes an enclosure such as the one described with the following components, which should not be limiting:

1) A CPU with cache memory;
2) Core logic device or means;
3) Main memory;
4) A single primary Hard Disk Drive ("HDD") that has a security program;
5) Flash memory with system BIOS and programmable user password;
6) Operating System, application software, data files on primary HDD;
7) An interface device and connectors to peripheral console;
8) A software controllable mechanical lock, lock control means, and other accessories.

The ACM connects to a peripheral console with power supply, a display device, an input device, and other elements. Some details of these elements with the present security system are described in more detail below.

*The central processing unit of the ACM has a power supply connection point, and interconnection circuitry coupled to said CPU and connectable to the console. The power supply connection point of said CPU is uncoupled from any electrical power source having sufficient energy to sustain execution of instructions whenever said interconnection circuitry is disconnected from the console.*

Figure 4:
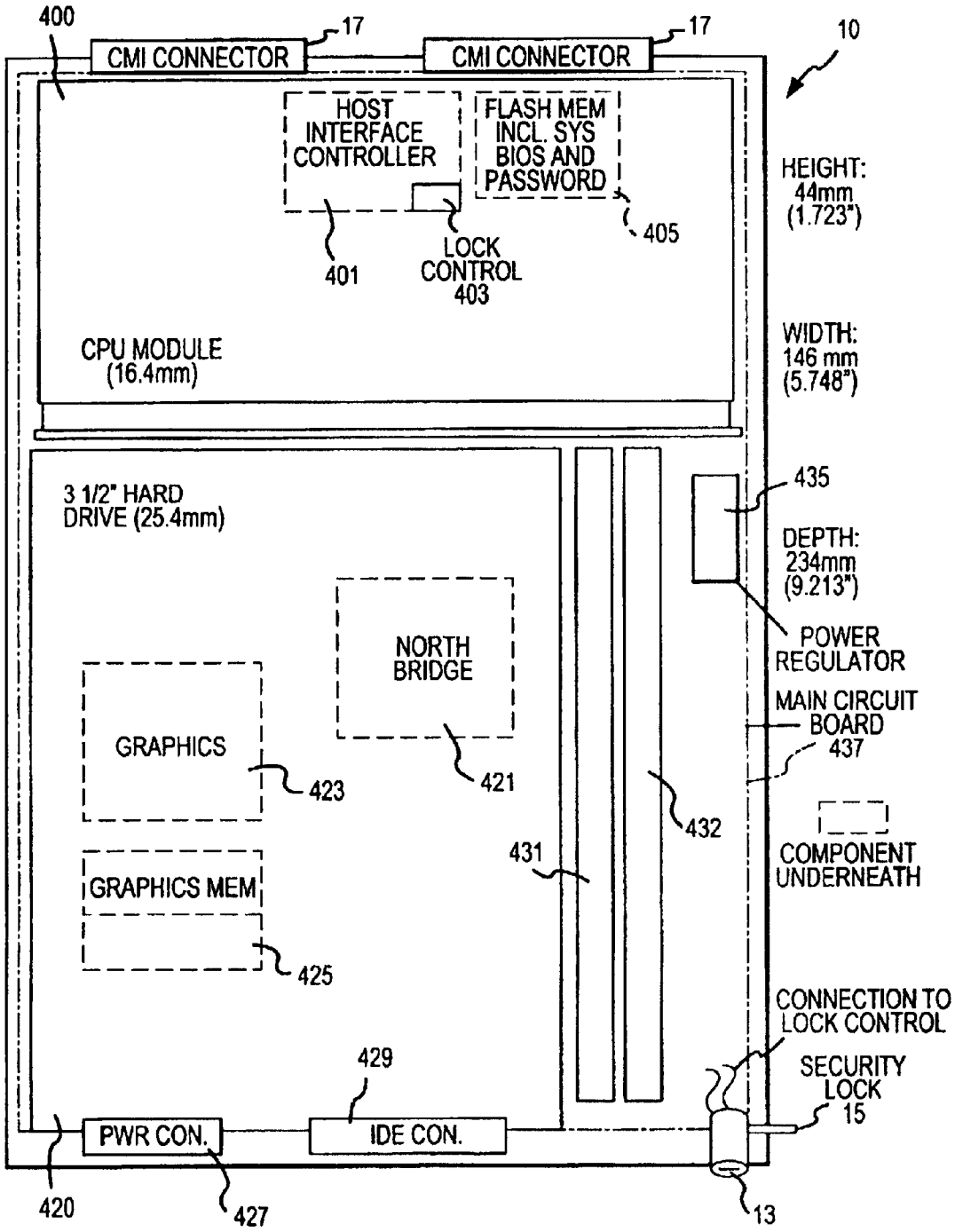
FIG. 4 is a simplified block diagram of a security system for a computer system according to an embodiment of the present invention.

FIG. 4 is a simplified layout diagram of a security system for a computer system according to an embodiment of the present invention. This diagram is merely an illustration and should not limit the scope of the claims herein. One of ordinary skill in the art would recognize other variations, modifications, and alternatives. The layout diagram illustrates the top-view of the module 10, where the backside components (e.g., Host Interface Controller) are depicted in dashed lines. The layout diagram has a first portion, which includes a central processing unit ("CPU") module 400, and a second portion, which includes a hard drive module 420. A common printed circuit board 437 houses these modules and the like. Among other features, the ACM includes the central processing unit module 400 with a cache memory 405, which is coupled to a north bridge unit 421, and a host interface controller 401. The host interface controller includes a lock control 403. As shown, the CPU module is disposed on a first portion of the attached computer module, and couples to connectors 17. Here, the CPU module is spatially located near connector 17.

The CPU module can use a suitable microprocessing unit, microcontroller, digital signal processor, and the like. In a specific embodiment, the CPU module uses, for example, a 400 MHz Pentium II microprocessor module from Intel Corporation and like microprocessors from AMD Corporation, Cyrix Corporation (now National Semiconductor Corporation), and others. In other aspects, the microprocessor can be one such as the Compaq Computer Corporation Alpha Chip, Apple Computer Corporation PowerPC G3 processor, and the like. Further, higher speed processors are contemplated in other embodiments as technology increases in the future.

In the CPU module, host interface controller 401 is coupled to BIOS/flash memory 405. Additionally, the host interface controller is coupled to a clock control logic, a configuration signal, and a peripheral bus. The present invention has a host interface controller that has lock control 403 to provide security features to the present ACM. Furthermore, the present invention uses a flash memory that includes codes to provide password protection or other electronic security methods.

The second portion of the attached computer module has the hard drive module 420. Among other elements, the hard drive module includes north bridge 421, graphics accelerator 423, graphics memory 425, a power controller 427, an IDE controller 429, and other components. Adjacent to and in parallel alignment with the hard drive module is a personal computer interface ("PCI") bus 431, 432. A power regulator 435 is disposed near the PCI bus.

In a specific embodiment, north bridge unit 421 often couples to a computer memory, to the graphics accelerator 423, to the IDE controller, and to the host interface controller via the PCI bus. Graphics accelerator 423 typically couples to a graphics memory 423, and other elements. IDE controller 429 generally supports and provides timing signals necessary for the IDE bus. In the present embodiment, the IDE controller is embodied as a 643U2 PCI-to IDE chip from CMD Technology, for example. Other types of buses than IDE are contemplated, for example EIDE, SCSI, 1394, and the like in alternative embodiments of the present invention.

The hard drive module or mass storage unit 420 typically includes a computer operating system, application software program files, data files, and the like. In a specific embodiment, the computer operating system may be the Windows98 operating system from Microsoft Corporation of Redmond, Wash. Other operating systems, such as WindowsNT, MacOS8, Unix, and the like are also contemplated in alternative embodiments of the present invention. Further, some typical application software programs can include Office98 by Microsoft Corporation, Corel Perfect Suite by Corel, and others. Hard disk module 420 includes a hard disk drive. The hard disk drive, however, can also be replaced by removable hard disk drives, read/write CD ROMs, flash memory, floppy disk drives, and the like. A small form factor, for example 2.5", is currently contemplated, however, other form factors, such as PC card, and the like are also contemplated. Mass storage unit 240 may also support other interfaces than IDE. Among other features, the computer system includes an ACM with security protection. The ACM connects to the console, which has at least the following elements, which should not be limiting.

1) Connection to input devices, e.g. keyboard or mouse;
2) Connection to display devices, e.g. Monitor;
3) Add-on means, e.g. PCI add-on slots;
4) Removable storage media subsystem, e.g. Floppy drive, CDROM drive;
5) Communication device, e.g. LAN or modem;
6) An interface device and connectors to ACM;
7) A computer module bay with a notch in the frame for ACM's lock; and
8) Power supply and other accessories.

As noted, the computer module bay is an opening in a peripheral console that receives the ACM. The computer module bay provides mechanical support and protection to ACM. The module bay also includes, among other elements, a variety of thermal components for heat dissipation, a frame that provides connector alignment, and a lock engagement, which secures the ACM to the console. The bay also has a printed circuit board to mount and mate the connector from the ACM to the console. The connector provides an interface between the ACM and other accessories.

Figure 5:
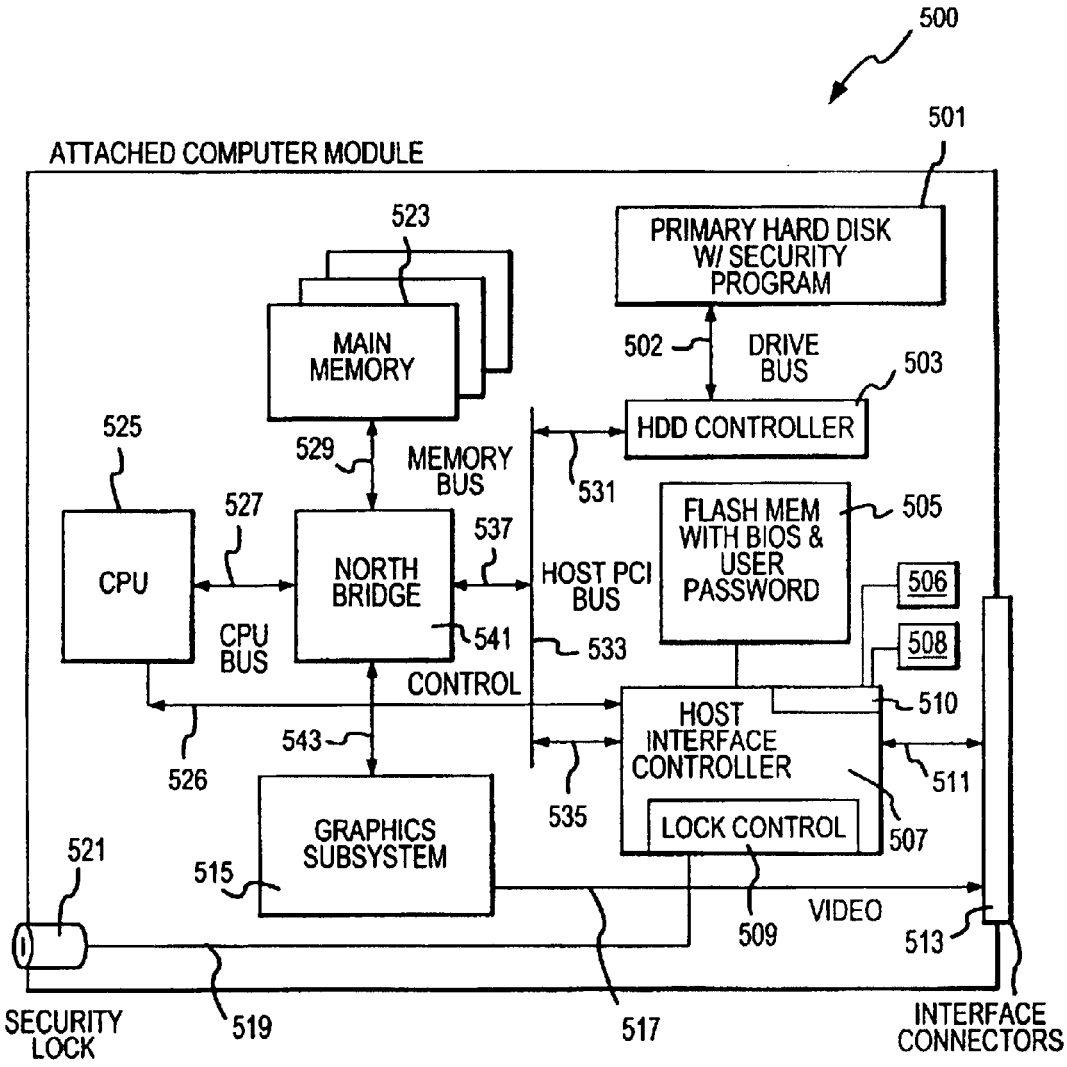
FIG. 5 is a simplified block diagram of a security system for a computer module according to an embodiment of the present invention.

FIG. 5 is a simplified block diagram 500 of a security system for a computer module according to an embodiment of the present invention. This diagram is merely an illustration and should not limit the scope of the claims herein. One of ordinary skill in the art would recognize other variations, modifications, and alternatives. The block diagram 500 has a variety of features such as those noted above, as well as others. In the present diagram, different reference numerals are used to show the operation of the present system.

The block diagram is an attached computer module 500. The module 500 has a central processing unit, which communicates to a north bridge 541, by way of a CPU bus 527. The north bridge couples to main memory 523 via memory bus 529. The main memory can be any suitable high speed memory device or devices such as dynamic random access memory ("DRAM") integrated circuits and others. The DRAM includes at least 32 Meg. or 64 Meg. and greater of memory, but can also be less depending upon the application. Alternatively, the main memory can be coupled directly with the CPU in some embodiments. The north bridge also couples to a graphics subsystem 515 via bus 542. The graphics subsystem can include a graphics accelerator, graphics memory, and other devices. Graphics subsystem transmits a video signal to an interface connector, which couples to a display, for example.

The attached computer module also includes a primary hard disk drive that serves as a main memory unit for programs and the like. The hard disk can be any suitable drive that has at least 2 GB and greater. As merely an example, the hard disk is a Marathon 2250 (2.25 GB, 2 ½ inch drive) product made by Seagate Corporation of Scotts Valley, but can be others. The hard disk communicates to the north bridge by way of a hard disk drive controller and bus lines 502 and 531. The hard disk drive controller couples to the north bridge by way of the host PCI bus, which connects bus 537 to the north bridge. The hard disk includes computer codes that implement a security program according to the present invention. Details of the security program are provided below.

The attached computer module also has a flash memory device 505 with a BIOS. The flash memory device 505 also has codes for a user password that can be stored in the device. The flash memory device generally permits the storage of such password without a substantial use of power, even when disconnected. As merely an example, the flash memory device has at least 4 Meg. or greater of memory, or 16 Meg. or greater of memory. A host interface controller 507 communications to the north bridge via bus 535 and host PCI bus. The host interface controller also has a lock control 509, which couples to a lock. The lock is attached to the module and has a manual override to the lock on the host interface controller in some embodiments. Host interface controller 507 communicates to the console using bus 511, which couples to connection 513.

Figure 5A:
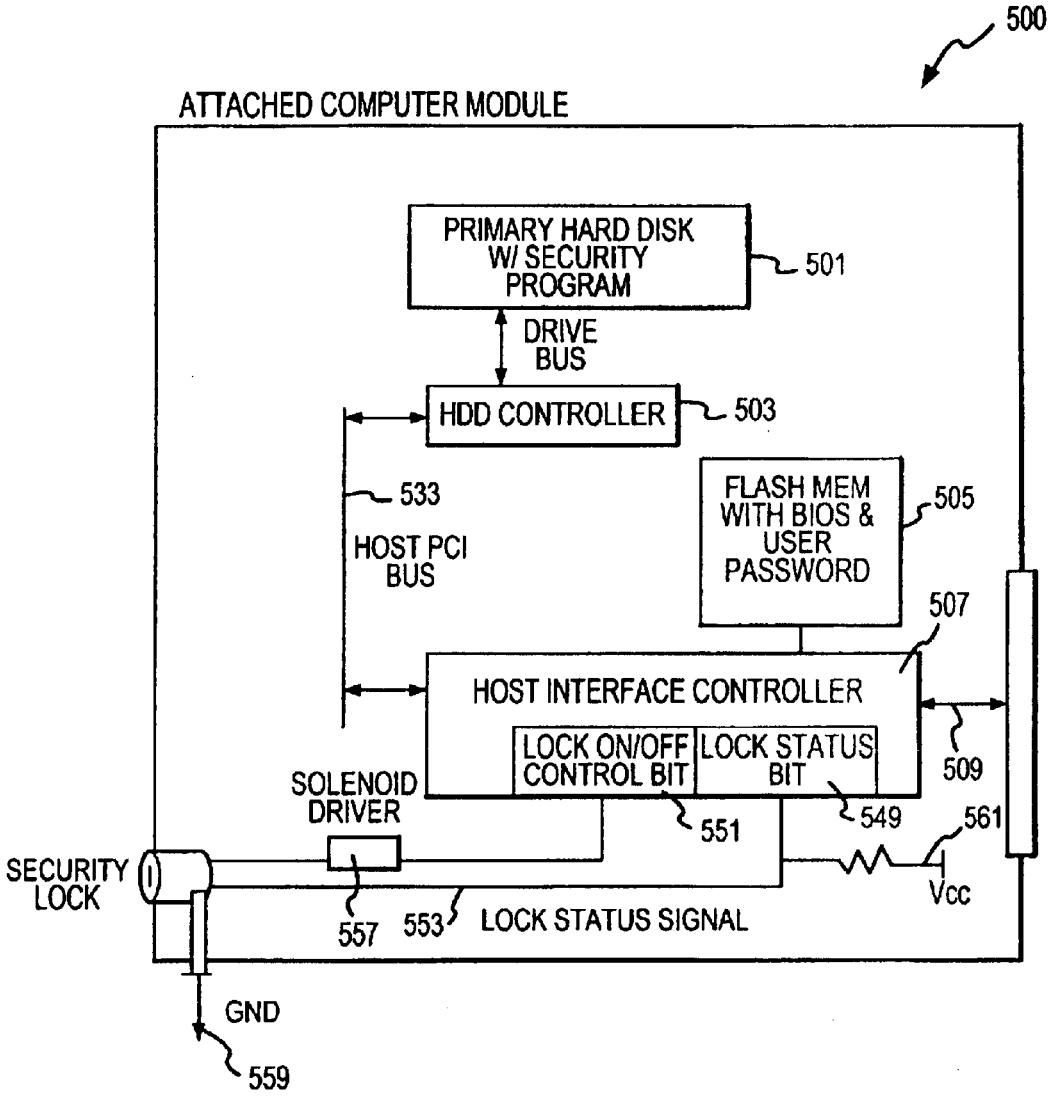

In one aspect of the present invention the security system uses a combination of electrical and mechanical locking mechanisms. Referring to FIG. 5A, for example, the present system provides a lock status mechanism in the host interface controller 509. The lock status of the lock is determined by checking a lock status bit 549, which is in the host interface controller. The lock status bit is determined by a signal 553, which is dependent upon the position of the lock. Here, the position of the lock is closed in the ground 559 position, where the latch couples to a ground plane in the module and/or system. Alternatively, the signal of the lock is at Vcc, for example, which is open. Alternatively, the signal can be ground in the open position and Vcc in the closed position, depending upon the application. Other signal schemes can also be used depending upon the application.

Once the status is determined, the host interface controller turns the lock via solenoid 557 in a lock on or lock off position, which is provided through the control bit 551, for example. The control bit is in a register of the host interface controller in the present example. By way of the signal schemes noted and the control bit, it is possible to place the lock in the lock or unlock position in an electronic manner. Once the status of the lock is determined, the host interface controller can either lock or unlock the latch on the module using a variety of prompts, for example.

In a preferred embodiment, the present invention uses a password protection scheme to electronically prevent unauthorized access to the computer module. The present password protection scheme uses a combination of software, which is a portion of the security program, and a user password, which can be stored in the flash memory device 505. By way of the flash memory device, the password device not become erased by way of power failure or the lock. The password is substantially fixed in code, which cannot be easily erased. Should the user desire to change the password, it can readily be changed by erasing the code, which is stored in flash memory and a new code (i.e., password) is written into the flash memory. An example of a flash memory device can include a Intel Flash 28F800F3 series flash, which is available in 8 Mbit and 16 Mbit designs. Other types of flash devices can also be used, however. Details of a password protection method are further explained below by way of the FIGS.

In a specific embodiment, the present invention also includes a real-time clock 510 in the ACM, but is not limited. The real-time clock can be implemented using a reference oscillator 14.31818 MHz 508 that couples to a real-time clock circuit. The real-time clock circuit can be in the host interface controller. An energy source 506 such as a battery can be used to keep the real-time clock circuit running even when the ACM has been removed from the console. The real-time clock can be used by a security program to perform a variety of functions. As merely an example, these functions include: (1) fixed time period in which the ACM can be used, e.g., ACM cannot be used at night; (2) programmed ACM to be used after certain date, e.g., high security procedure during owner's vacation or non use period; (3) other uses similar to a programmable time lock. Further details of the present real-time clock are described in the application listed under Ser. No. 09/183,816 noted above.

In still a further embodiment, the present invention also includes a permanent password or user identification code to identify the computer module. In one embodiment, the permanent password or user code is stored in a flash memory device. Alternatively, the permanent password or user code is stored in the central processing unit. The password or user code can be placed in the device upon manufacture of such device. Alternatively, the password or user code can be placed in the device by a one time programming techniques using, for example, fuses or the like. The present password or user code provides a permanent "finger print" on the device, which is generally hardware. The permanent finger print can be used for identification purposes for allowing the user of the hardware to access the hardware itself, as well as other systems. These other systems include local and wide area networks. Alternatively, the systems can also include one or more servers. The present password and user identification can be quite important for electronic commerce applications and the like. In one or more embodiments, the permanent password or user code can be combined with the password on flash memory for the security program, which is described below in more detail.

II. SECURITY DETECTION PROGRAMS

Figure 6:
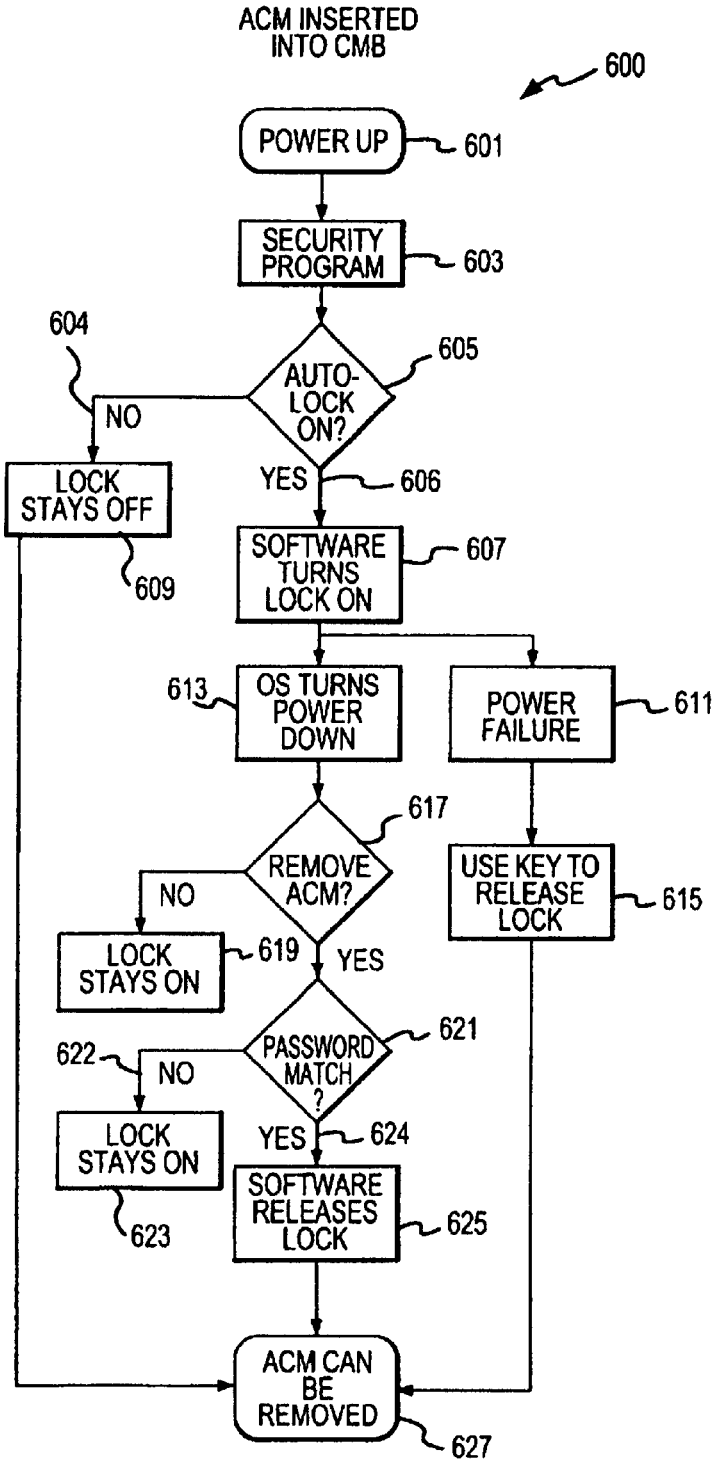
FIGS. 6 and 7 show simplified flow diagrams of security methods according to embodiments of the present invention.
Figure 7:
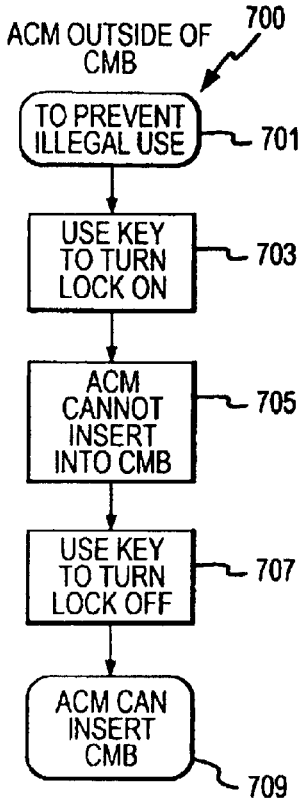

FIGS. 6 and 7 show simplified flow diagrams 600, 700 of security methods according to embodiments of the present invention. These diagrams are merely illustrations and should not limit the scope of the claims herein. One of ordinary skill in the art would recognize other variations, modifications, and alternatives. Referring to FIG. 6, which considers an example for when the ACM is inserted into the computer module bay in the console, ACM has already been inserted into the console and is firmly engaged in an electrical and mechanical manner. A computer system is powered up 601, which provides selected signals to the microprocessor. The microprocessor oversees the operation of the computer system. The microprocessor searches the memory in, for example, the hard disk drive and execute a security program, step 603.

The security program runs through a sequence of steps before allowing a user to operate the present system with the ACM. Among other processes, the security program determines if an "Auto-lock" is ON. If so, the security program goes via branch 606 to step 607. Alternatively, the security program goes to step 609, which determines that the lock stays OFF and loops to step 627, which indicates that the ACM can be removed physically from the console. In step 607, the security program turns a switch or switching means that turns ON a lock, which can be electrical, mechanical, or a combination of electrical and mechanical.

In a specific embodiment, the security program turns OFF the power of the ACM and console. Here, the security program directs the OS to turn the power OFF, step 613. In an embodiment where power failure occurs (step 611), a key is used to release a latch in the ACM on the lock 615, where the ACM can be removed, step 627. From step 613, the security program determines if the ACM is to be removed, step 617. If not, the lock stays ON, step 619. Alternatively, the security detection program determines if the password (or other security code) matches with the designated password, step 621. If not, the lock stays ON, step 623. Alternatively, the security program releases the lock 625, which frees the ACM. Next, the ACM can be removed, step 627.

In an alternative embodiment, the present invention provides a security system for the ACM, which is outside the console or computer module bay. See, FIG. 7, for example. As shown, the security system is implemented to prevent illegal or unauthorized use (step 701) of the ACM, which has not been used in the console. Here, a key turns ON a lock (step 703). The lock moves a latch in the ACM to a specific spatial location that physically blocks the passage of the ACM into the computer module bay. Accordingly, the ACM cannot insert (step 705) into the computer module bay.

In an alternative aspect, the key can be used to turn the lock OFF, step 707. Here, the key moves the latch in a selected spatial location that allows the ACM to be inserted into the computer bay module. In the OFF position, the ACM inserts into the computer module bay, step 709. Once the ACM is in the bay, a user can begin operating the ACM through the console. In one embodiment, the computer console including the ACM goes through the sequence of steps in the above FIG., but is not limited.

In a specific embodiment, the present invention implements the sequences above using computer software. In other aspects, computer hardware can also be used and is preferably in some applications. The computer hardware can include a mechanical lock, which is built into the ACM. An example of such mechanical lock is shown above, but can also be others. In other aspects, the lock can be controlled or accessed electronically by way of computer software. Here, the key can be used to as a manual override if the ACM or computer fails.

The lock is used to prevent theft and accidental removal inside CMB. The current invention locates the lock inside the ACM to allow a user to keep a single key as ACM is moved from console to console at different locations. When ACM is in transit, the lock can be engaged using the key so that the latch extends outside ACM's enclosure. The extended latch prevents ACM from being inserted into any CMB. This prevents any illegal use of ACM by someone other than the user.

In one aspect of the invention, the user password is programmable. The password can be programmable by way of the security program. The password can be stored in a flash memory device within the ACM. Accordingly, the user of the ACM and the console would need to have the user password in order to access the ACM. In the present aspect, the combination of a security program and user password can provide the user a wide variety of security functions as follows:

1) Auto-lock capability when ACM is inserted into CMB;

2) Access privilege of program and data;

3) Password matching for ACM removal; and

4) Automatic HDD lock out if tempering is detected.

In still a further embodiment, the present invention also includes a method for reading a permanent password or user identification code to identify the computer module. In one embodiment, the permanent password or user code is stored in a flash memory device. Alternatively, the permanent password or user code is stored in the central processing unit. The password or user code can be placed in the device upon manufacture of such device. Alternatively, the password or user code can be placed in the device by a one time programming techniques using, for example, fuses or the like. The present password or user code provides a permanent "finger print" on the device, which is generally hardware. The permanent finger print can be used for identification purposes for allowing the user of the hardware to access the hardware itself, as well as other systems. These other systems include local and wide area networks. Alternatively, the systems can also include one or more servers. The present method allows a third party confirm the user by way of the permanent password or user code. The present password and user identification can be quite important for electronic commerce applications and the like, which verify the user code or password. In one or more embodiments, the permanent password or user code can be combined with the password on flash memory for the security program.

Figure 8:
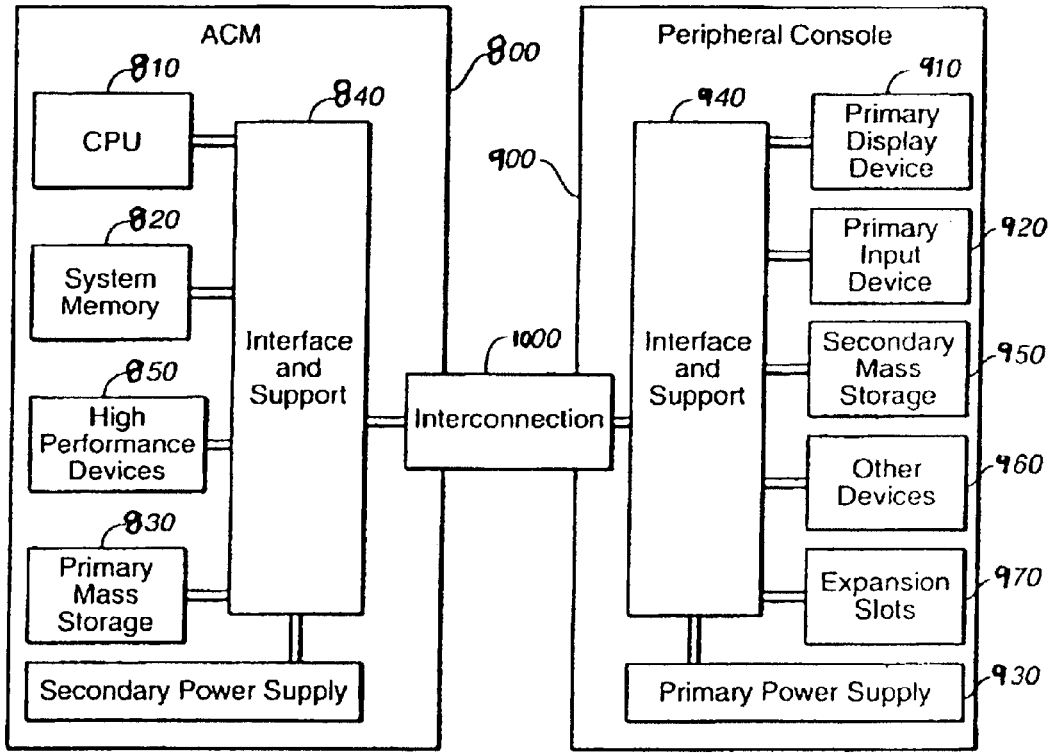
*FIG. 8 is a block diagram of one embodiment of a computer system employing the present invention.*

*FIG. 8 is a block diagram of the components in one computer system employing the present invention. The computer system comprises an attached computer module (ACM), a peripheral console (PCON), and the interconnection apparatus between them. The ACM includes the central processing unit (CPU) 810, system memory 820, high performance devices 850, primary mass storage 830, and related interface and support circuitry 840. The PCON includes primary display 910, primary input 920, secondary mass storage 950, other devices 960, expansion slots 970, the primary power supply 930, and related interface and support circuitry 940. The interconnection apparatus 1000 includes circuitry to convey power and operational signals between the ACM and PCON.*

*Within the ACM 800, the CPU 810 executes instructions and manipulates data stored in the system memory. The CPU 810 and system memory 820 represent the user's core computing power. The core computing power may also include high performance devices 850 such as advanced graphics processor chips that greatly increase overall system performance and which, because of their speed, need to be located close to the CPU. The primary mass storage 830 contains persistent copies of the operating system software, application software, configuration data, and user data. The software and data stored in the primary mass storage device represent the user's computing environment. Interface and support circuitry 840 primarily includes interface chips and signal busses that interconnect the CPU, system memory, high performance devices, and primary mass storage. The interface and support circuitry also connects ACM-resident components with the ACM-to-PCON interconnection apparatus as needed.*

*Within the PCON 900, the primary display component 910 may include an integrated display device or connection circuitry for an external display device. This primary display device may be, for example, an LCD, plasma, or CRT display screen used to display text and graphics to the user for interaction with the operating system and application software. The primary display component is the primary output of the computer system, i.e., the paramount vehicle by which programs executing on the CPU can communicate toward the user.*

*The primary input component 920 of the PCON may include an integrated input device or connection circuitry for attachment to an external input device. The primary input may be, for example, a keyboard, touch screen, keypad, mouse, trackball, digitizing pad, or some combination thereof to enable the user to interact with the operating system and application software. The primary input component is the paramount vehicle by which programs executing on the CPU receive signals from the user.*

*The PCON may contain secondary mass storage 950 to provide additional high capacity storage for data and software. Secondary mass storage may have fixed or removable media and may include, for example, devices such as diskette drives, hard disks, CD-ROM drives, DVD drives, and tape drives.*

*The PCON may be enhanced with additional capability through the use of integrated "Other Devices" 960 or add-on cards inserted into the PCON's expansion slots 970. Examples of additional capability include sound generators, LAN connections, and modems. Interface and support circuitry 940 primarily includes interface chips, drive chips, and signal busses that interconnect the other components within the PCON. The interface and support circuitry also connects PCON-resident components with the ACM-to-PCON interconnection apparatus as needed.*

*Importantly, the PCON houses the primary power supply 930. The primary power supply has sufficient capacity to power both the PCON and the ACM 800 for normal operation. Note that the ACM may include a secondary "power supply" in the form, for example, of a small battery. Such a power supply would be included in the ACM to maintain, for example, a time-of-day clock, configuration settings when the ACM is not attached to a PCON, or machine state when moving an active ACM immediately from one PCON to another. The total energy stored in such a battery would, however, be insufficient to sustain operation of the CPU at its rated speed, along with the memory and primary mass storage, for more than a fraction of an hour, if the battery were able to deliver the required level of electrical current at all.*

Figure 9:
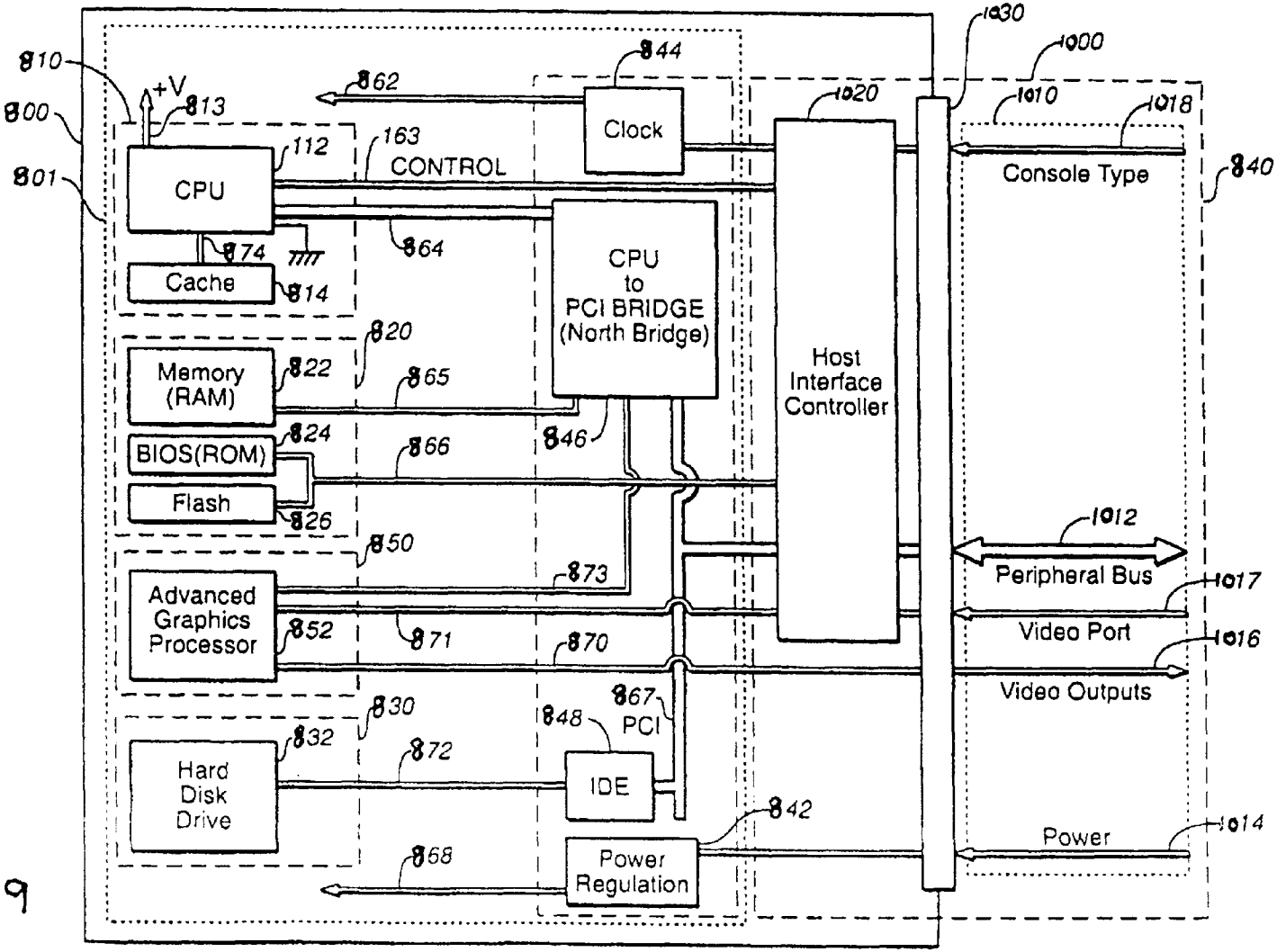
*FIG. 9 is a block diagram of an attached computing module (ACM).*

*FIG. 9 is a block diagram of an attached computing module (ACM) 800. The physical ACM package 800 contains the*

*ACM functional components 801 and the ACM side of the ACM-to-PCON Interconnection 1000. The ACM 801 comprises a CPU component 810, a system memory component 820, a primary mass storage component 830, a high performance devices components 850, and an interface and support component 840.*

*The ACM side of the ACM-to-PCON Interconnection 1000 comprises a Host Interface Controller (HIC) component 1020 and an ACM connector component 1030. The HIC 1020 and connector 1030 components couple the ACM functional components 800 with the signals of an ACM-to-PCON interface bus 1010 used to operatively connect an ACM with a PCON. The ACM-to-PCON interface bus 1010 comprises conveyance for electrical power 1014 and signals for a peripheral bus 1012, video 1016, video port 1017, and console type 1018. The preferred ACM-to-PCON Interconnection 1000 is described in detail in a companion U.S. patent application, Ser. No. 09/149,882, entitled "A Communication Channel and Interface Devices for Bridging Computer Interface Buses," by the same inventor, filed on the same day herewith, and hereby incorporated by reference. The preferred ACM-to-PCON interconnection 1000 includes circuitry to transmit and receive parallel bus information from multiple signal paths as a serial bit stream on a single signal path. This reduces the number of physical signal paths required to traverse the interconnection 1000. Further, employing low-voltage differential signaling (LVDS) on the bit stream data paths provides very reliable, high-speed transmission across cables. This represents a further advantage of the present invention.*

*The CPU component 810 of the ACM functional circuitry 801 of the presently described embodiment comprises a microprocessor 812, which is the chief component of the personal computer system, power supply connection point 813, and cache memory 814 tightly coupled to the microprocessor 812 by the CPU-to-cache bus 874 comprising signal paths for address, data, and control information. The microprocessor 812 of this embodiment is one of the models from the Pentium II family of processors from Intel Corporation. Microprocessor 812 receives electrical power from power bus 168 via connection point 813. Microprocessor 812 couples to the Host Interface Controller (HIC) 320 via CPU-to-HIC bus 863 comprising signal paths to exchange control information such as an interrupt request. Microprocessor 812 also couples to CPU Bridge 846 via CPU main bus 864 comprising signal paths for address, data, and control information.*

*The CPU Bridge component 846 of the interface and support circuitry 840 operates to couple the high speed CPU main bus 864 to specialty buses of varying speeds and capability that connect other computer components. The CPU Bridge of the presently described embodiment incorporates memory controller circuitry, advanced graphics processor support circuitry, and a general, industry-standard PCI bus controller in a single package. A CPU Bridge 146 such as the 82443LX PCI/AGP Controller from Intel Corporation may be used.*

*The system memory component 820 of the ACM functional circuitry 801 in the present embodiment comprises main system memory (RAM) 822, BIOS memory 824, and flash memory 826. The system memory 820 is used to contain data and instructions that are directly addressable by the CPU. The RAM 822 comprises volatile memory devices such as DRAM or SDRAM memory chips that do not retain their stored contents when power is removed. This form of memory represents the largest proportion of total system memory 820 capacity. The BIOS memory 824 comprises non-volatile memory devices such as ROM or EPROM memory chips that retain their stored contents regardless of the application of power and are read-only memory under normal operating conditions. The BIOS memory 824 stores, for example, start-up instructions for the microprocessor 812 and sets of instructions for rudimentary input/output tasks. The flash memory 826 comprises non-volatile memory devices that retain their stored contents regardless of the application of power. Unlike the BIOS non-volatile memory, however, the stored contents of the flash memory 826 are easily changed under normal operating conditions. The flash memory 826 may be used to store status and configuration data, such as security identifiers or ACM specifications like the speed of the microprocessor 812. Some embodiments may combine the BIOS functions into the flash memory device, thus permitting BIOS contents to be rewritten, improving field upgradability.*

*The main system memory (RAM) 822 is coupled to memory controller circuitry resident within the CPU Bridge 846 via direct memory bus 865. The BIOS 824 and flash memory 826 are coupled to HIC 1020 via switched memory bus 866. This permits the BIOS 824 and flash 826 memories to be accessed by circuitry in the HIC 1020 or other circuitry connected thereto. The direct memory bus 865 and the switch memory bus 866 each comprises conductors to convey signals for data, address, and control information.*

*The primary mass storage component 830 of the ACM functional circuitry 801 in the present embodiment comprises a compact hard disk drive with an industry-standard, IDE interface. The hard disk drive (HDD) 832 has a formatted storage capacity sufficient to contain an operating system for the computer, application software described by the user, and related user configuration and operating parameter data. The HDD 832 in the present embodiment serves as the "boot" device for the personal computer from which the operating system is loaded into RAM 122 by the start-up program stored in the BIOS 824.*

*The present HDD 832 has a capacity of approximately 2,000 megabytes to provide adequate storage for common software configurations and reasonable space for user data. One example of a common software configuration includes the Windows 95 operating system from Microsoft Corporation, a word processing program, a spreadsheet program, a presentation graphics program, a database program, an email program, and a web browser such as Navigator from Netscape Corporation. The hard disk 832 stores program and data files for each software component, including files distributed by the vendor as well as files created or updated by operation of the software after it is installed. For example, a word processor program may maintain information about a user's identity and latest preferences in an operating system registry file. Or, for example, the web browser may maintain a file of the user's favorite web sites or most recently viewed web pages. An HDD with 2000 megabyte capacity is readily available in the small size of hard disk (e.g., 2.5-inch or 3.5-inch) to minimize the space required within the ACM for the primary mass storage device 130.*

*The HDD 832 is coupled to IDE controller circuitry 848 via IDE bus 872. The IDE controller circuitry 848 is coupled to the CPU Bridge 846 via the Host PCI bus 867. IDE controllers and busses, and the PCI bus are well known and understood in the industry. The above components operate together to couple the hard disk drive 832 to the microprocessor 812.*

*The high performance devices component 850 of the ACM functional circuitry 801 in the present embodiment com-*

*prises an Advanced Graphics Processor (AGP) 852. The Model 740 Graphics Device from Intel Corporation may be used in the present embodiment as the AGP.*

*Increases in computer screen size, graphics resolution, color depth, and visual motion frame rates, used by operating system and application software alike, have increased the computing power required to generate and maintain computer screen displays. An AGP removes a substantial portion of the graphics computing burden from the CPU to the specialized high-performance processor, but a high level of interaction between the CPU and the specialized processor is nonetheless required. To maximize the effective contribution of having a specialized processor in the presently described embodiment, the AGP 852 is located in the ACM 800, wherein it is in close proximity to the microprocessor 812. The AGP 852 is coupled to the microprocessor 812 via the advanced graphics port bus 873 of the CPU Bridge 846. The visual display signal generated by the AGP are conveyed toward actual display devices at the peripheral console (PCON) via video signal bus 870. Video information from a source external to the ACM and appearing as video port signals 1017 may be conveyed to the AGP 852 via video port signal path 871.*

*Other types of high performance components may be included in different ACM configurations. For example, an interface to an extremely high speed data communication facility may be desirable in some future computer where CPU-to-network interaction is of comparable intensity to today's CPU-to-graphics interaction. Because such high performance components tend to be high in cost, their inclusion in the ACM is desirable. Inclusion of high cost, high performance components in the ACM concentrates a user's core computing power and environment in a portable package. This represents a further advantage of the invention.*

*The interface and support component 840 of the ACM functional circuitry 801 in the present embodiment comprises circuitry for power regulation 842, clocking 844, CPU Bridge 846, IDE controller 848, and signal conveyance paths 861–874. The CPU Bridge 846 couples the CPU component 810 of the ACM 800 with the other components of the ACM 820–850 and the CPU-to-PCON Interconnection 1000. The CPU Bridge 846 and IDE controller 848 have already been discussed. Power regulation circuitry 842 receives electrical power via the electrical power conduction path 1014 of the CPU-to-PCON Interconnection 1000, conditions and distributes it to the other circuitry in the ACM using power distribution bus 868. Such regulation and distribution is well known and understood in the art.*

*Clocking circuitry 844 generates clock signals for distribution to other components within the ACM 800 that require a timing and synchronization clock source. The CPU 810 is one such component. Often, the total power dissipated by a CPU is directly proportional to the frequency of its main clock signal. The presently described embodiment of the ACM 800 includes circuitry that can vary the frequency of the main CPU clock signal conveyed to the CPU via signal path 862, in response to a signal received from the host interface controller (HIC) 1020 via signal path 861. The generation and variable frequency control of clocking signals is well understood in the art. By varying the frequency, the power consumption of the CPU (and thus the entire ACM) can be varied.*

*The variable clock rate generation may be exploited to match the CPU power consumption to the available electrical power. Circuitry in the host interface controller (HIC) 1020 of the presently described embodiment adjusts the frequency control signal sent via signal path 861 to the clocking circuit 844, based on the "console type" information signal 1018 conveyed from the peripheral console (PCON) by the CPU-to-PCON interconnection 1000. In this arrangement, the console type signal originating from a desktop PCON would result in the generation of a maximum speed CPU clock. The desktop PCON, presumably has unlimited power from an electrical wall outlet and does not need to sacrifice speed for power conservation. The console type signal originating from a notebook PCON would, however, result in the generation of a CPU clock speed reduced from the maximum in order to conserve battery power and extend the duration of computer operation obtained from the energy stored in the battery. The console type signal originating from a notepad PCON would result in the generation of a CPU clock speed reduced further yet, the notepad PCON presumably having smaller batteries than the notebook PCON. Inclusion of control signals and circuitry to effect a CPU clock signal varying in frequency according to characteristics of the PCON to which the ACM is connected facilitates the movement of the user's core computing power and environment to different work settings, which is a further advantage of the present invention.*

Figure 10:
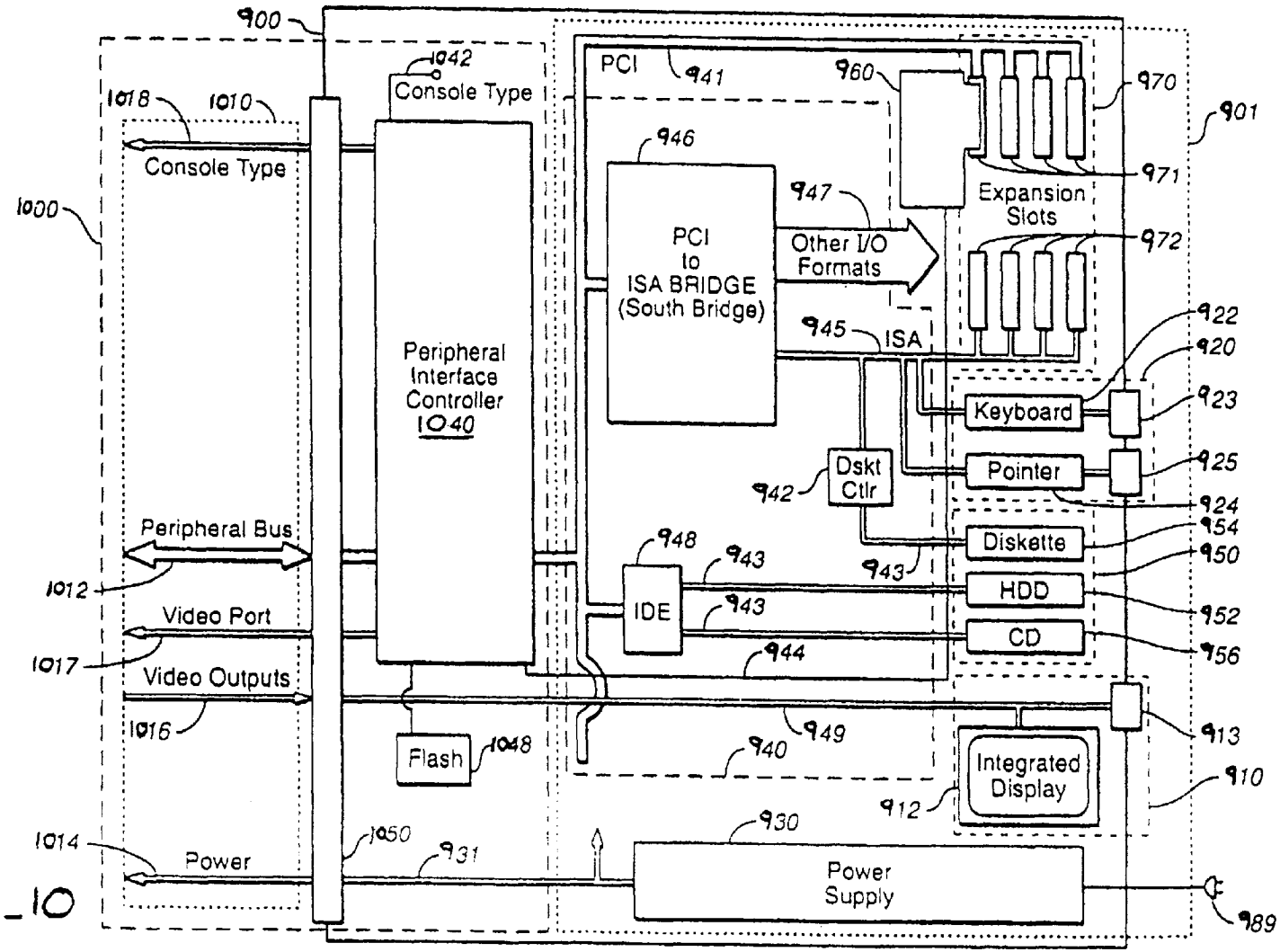
*FIG. 10 is a block diagram of a peripheral console (PCON).*

*FIG. 10 is a block diagram of a peripheral console (PCON). A peripheral console couples with an ACM to form an operating personal computer system. The peripheral console (PCON) supplies an ACM with primary input, display, and power supply; the ACM supplies the core computing power and environment of the user. In the presently described embodiment the physical PCON package 900 contains the PCON functional components 901 and the PCON side of the ACM-to-PCON Interconnection 1000. The PCON functional components 901 comprise primary display 910, a primary input 920, a primary power supply 930, interface and support 940, secondary mass storage 950, other devices 960, and expansion slots 970.*

*The PCON side of the ACM-to-PCON Interconnection 1000 comprises a Peripheral Interface Controller (PIC) component 1040, a PCON connector component 1050, console-type component 1042, and flash memory device 1048. The PIC 1040 and connector 1050 components couple the PCON functional components 901 with the signals of an ACM-to-PCON interface bus 1010 used to operatively connect an ACM with a PCON. The ACM-to-PCON interface bus 1010 comprises conveyance for electrical power 1014 and signals for a peripheral bus 1012, video 1016, video port 1017, and console-type 1018. The preferred ACM-to-PCON Interconnection 1000 is described in detail in the U.S. patent application entitled "A Communication Channel and Interface Devices for Bridging Computer Interface Buses," already incorporated herein by reference.*

*Connector component 1050 may be selected to mate directly with the connector component 1030 of an ACM (shown in FIG. 9). Alternatively, connector component 1050 may be selected to mate with, for example, the connector on one end of a cable intervening between the PCON and an ACM in a particular embodiment. The ACM-to-PCON interconnection described in the aforementioned companion patent application has the advantage of providing reliable signal conveyance across low cost cables.*

*Flash memory device 1048 provides non-volatile storage. This storage may be accessible to devices in both the ACM and the PCON, including the host interface controller and the peripheral interface controller to which it is connected. As such, flash memory 1048 may be used to store configuration and security data to facilitate an intelligent mating between an ACM and a PCON that needs no participation of the CPU.*

*The primary display component 910 of the PCON functional circuitry 901 of the presently described embodiment comprises integrated display panel 912 and video connector 913. Integrated display panel 912 is a color LCD display panel having a resolution of 640 horizontal by 480 vertical pixels. 640-by-480 resolution is popularly considered to be the minimum screen size to make practical use of the application software in widespread use today. One skilled in the art recognizes that the type and resolution of the display can vary greatly from embodiment to embodiment, depending on factors such as cost and intended application. Any display device may be used, without departing from the scope and spirit of the invention, that provides principal visual output to the computer user for operating system and application software executing in its customary and intended fashion using the CPU component (810 of FIG. 8) of an ACM presently coupled to PCON 900.*

*Integrated display panel 912 is coupled to video signal bus 949 and displays a screen image in response to video signals presented on bus 949. Certain pins of connector 1050 receive video output signals 1016 of the ACM-to-PCON interface bus 1010 from a mated connector that is coupled to an ACM. These certain pins of connector 1050 couple to video signal bus 949 which conveys the video output signals 1016 throughout the PCON 900 as needed. Video connector 913 is exposed at the exterior of PCON 900 and couples to video signal bus 949. connector 913 permits easy attachment of an external display device that is compatible with the signals carried by bus 949, such as a CRT monitor (not shown). The external display device may be used in addition, or as an alternative, to integrated display panel 912.*

*The isolation of the relatively heavy and sizable primary display 910 from the core computing power and user environment contained within an ACM represents a further advantage of the present invention.*

*The primary input component 920 of the PCON functional circuitry 901 of the presently described embodiment comprises keyboard interface circuitry 922, keyboard connector 923, pointer interface circuitry 924, and pointer connector 925. Keyboard interface circuitry 922 and pointer interface circuitry 924 connect to ISA bus 945 and are thereby coupled to the CPU component (810 of FIG. 8) of any ACM attached to PCON 900. Keyboard interface circuitry 922 interfaces a standard computer keyboard (not shown), attached at connector 923, to ISA bus 945. Pointer interface circuitry 922 interfaces a standard computer pointing device (not shown), such as a computer mouse attached at connector 925, to ISA bus 945. Computer keyboards, pointing devices, connectors 923, 925, keyboard interface circuitry 922, and pointer interface circuitry 924 are well known in the art. The isolation of the relatively heavy and sizable primary input devices 920 from the core computing power and user environment contained within an ACM represents a further advantage of the present invention.*

*The primary power supply component 930 of the PCON functional circuitry 901 of the presently described embodiment provides electrical energy for the sustained, normal operation of the PCON 900 and any ACM coupled to connector 1050. The power supply may be of the switching variety well known in the art that receives electrical energy from an AC source 989, such as a wall outlet. Power supply 930 reduces the alternating current input voltage, to a number of distinct outputs of differing voltages and current capacities. The outputs of power supply 930 are applied to power bus 931. Power bus 931 distributes the power supply outputs to the other circuitry within the PCON 900. Bus 931 also connects to certain pins of connector 1050 to provide the electrical power 1014 for an ACM conveyed by ACM-to-PCON interconnection 1000. The isolation of the usually heavy power supply 930 from the core computing power and user environment contained within the ACM represents a further advantage of the present invention.*

*The interface and support component 940 of the PCON functional circuitry 901 of the presently described embodiment comprises peripheral bridge 246, diskette controller 242, IDE controller 948, and signal conveyance paths 941, 943, 944, 945, 947 and 949. Peripheral bridge 946 couples PCI peripheral bus 941 with peripheral busses of other formats such as ISA peripheral bus 945 and others 947. PCI and ISA peripheral busses are industry standards, well known and understood in the art. Other peripheral busses 947 may include, for example, a bus compliant with the universal serial bus (USB) industry standard. While other embodiments of a peripheral console 900 may include a single peripheral bus that is coupled to an attached ACM via ACM-to-PCON interconnection 1000, such as PCI bus 941, this embodiment includes peripheral bridge 946 to establish additional busses 945, 947. The additional busses 945, 947 permit the use of the many low-cost and readily available components compatible with these bus specifications.*

*Diskette controller 942 interfaces a floppy disk drive 954 with the CPU component 810 of an attached ACM (shown in FIG. 9) so that the CPU may control and use the diskette drive 954 hardware to store and retrieve data. Diskette controller 942 couples to the CPU via a connection to ISA bus 945. Diskette controller 942 connects to the diskette drive 954 via one of device cables 943.*

*Similarly, IDE controller 948 interfaces a hard disk drive 952 and a CDROM drive 956 with the CPU component 810 of an attached ACM (shown in FIG. 9) so that the CPU may control and use the hard disk drive 952 and CDROM 956 hardware to store and retrieve data. IDE controller 948 couples to the CPU via connection to PCI peripheral bus 941. IDE controller 948 connects to each of hard disk drive 952 and CD-ROM drive 956 via one of device cables 943. Some embodiments of PCON 900 may take advantage of VLSI integrated circuits such as an 82371SB (PIIX4) integrated circuit from Intel Corporation. An 82371SB integrated circuit includes circuitry for both the peripheral bridge 946 and the IDE controller 948 in a single package.*

*The secondary mass storage component 950 of the PCON functional circuitry 901 of the presently described embodiment comprises diskette drive 954, hard disk drive 952, and CD-ROM drive 956. Secondary mass storage 950 generally provides low-cost, non-volatile storage for data files which may include software program files. Data files stored on secondary mass storage 950 are not part of a computer user's core computing power and environment. Secondary mass storage 950 may be used to store, for example, seldom used software programs, software programs that are used only with companion hardware devices installed in the same peripheral console 900, or archival copies of data files that are maintained in primary mass storage 850 of an ACM (shown in FIG. 9). Storage capacities for secondary mass storage 950 devices may vary from the 1.44 megabytes of the 3.5-inch high density diskette drive 954, to more than 10 gigabytes for a large format (5-inch) hard disk drive 952. Hard disk drive 952 employs fixed recording media, while diskette drive 954 and CD-ROM drive 956 employ removable media. Diskette drive 954 and hard disk drive 952 support both read and write operations (i.e., data stored on their recording media may be both recalled and modified) while CD-ROM drive 956 supports only read operations.*

*The other devices component 960 of the PCON functional circuitry 901 of the presently described embodiment comprises a video capture card. A video capture card accepts analog television signals, such as those complying with the NTSC standard used for television broadcast in the United States, and digitizes picture frames represented by the analog signal for processing by the computer. Video capture cards at present are considered a specialty, i.e., not ubiquitous, component of personal computer systems. Digitized picture information from video capture card 960 is carried via signal conveyance path 944 to the peripheral interface controller 1040 which transforms it to the video port signals 1017 of the ACM-to-PCON interconnection 1000 for coupling to the advanced graphics processor 852 in an attached ACM (shown in FIG. 9).*

*Video capture card 960 is merely representative of the many types of "other" devices that may be installed in a PCON to expand the capabilities of the personal computer. Sound cards and laboratory data acquisition cards are other examples. Video capture card 960 is shown installed in one of expansion slots 970 for coupling to the interface and control circuitry 940 of the PCON. Any of other devices 960 could be coupled to the interface and control circuitry 940 of the PCON by different means, such as direct installation on the circuit board that include the interface and control circuitry 940; e.g., a motherboard.*

*The expansion slots component 970 of the PCON functional circuitry 901 of the presently described embodiment comprises PCI connectors 971 and ISA connectors 972. A circuit card may be inserted into one of the connectors 971, 972 in order to be operatively coupled with the CPU 1010 of an attached ACM (shown in FIG. 9). Each of connectors 971 electrically connects to PCI bus 941, and may receive and hold a printed circuit card which it electrically couples to PCI bus 941. Each of connectors 972 electrically connects to ISA bus 945, and may receive and hold a printed circuit card which it electrically couples to ISA bus 945. The PCI 941 and ISA 945 busses couple to the CPU 1010 of an attached ACM (shown in FIG. 9) by circuitry already described.*

*Embodiments in accordance with the present invention may interface two PCI or PCI-like buses using a non-PCI or non-PCI-like channel. In accordance with embodiments of the present invention, PCI control signals are encoded into control bits and the control bits, rather than the control signals that they represent, are transmitted on the interface channel. At the receiving end, the control bits representing control signals are decoded back into PCI control signals prior to being transmitted to the intended PCI bus.*

*The fact that control bits rather than control signals are transmitted on the interface channel allows using a smaller number of signal channels and a correspondingly small number of conductive lines in the interface channel than would otherwise be possible. This is because the control bits can be more easily multiplexed at one end of the interface channel and recovered at the other end than control signals. This relatively small number of signal channels used in the interface channel allows using LVDS channels for the interface. As mentioned above, an LVDS channel is more cable friendly, faster, consumes less power, and generates less noise than a PCI bus channel, which is used in the prior art to interface two PCI buses. Therefore, the present invention advantageously uses an LVDS channel for the hereto unused purpose of interfacing PCI or PCI-like buses. The relatively smaller number of signal channels in the interface also allows using connectors having smaller pins counts. As mentioned above an interface having a smaller number of signal channels and, therefore, a smaller number of conductive lines is less bulky and less expensive than one having a larger number of signal channels. Similarly, connectors having a smaller number of pins are also less expensive and less bulky than connectors having a larger number of pins.*

*In a preferred embodiment, the interface channel has a plurality of serial bit channels numbering fewer than the number of parallel bus lines in each of the PCI buses and operates at a clock speed higher than the clock speed at which any of the bus lines operates. More specifically, the interface channel includes two sets of unidirectional serial bit channels which transmit data in opposite directions such that one set of bit channels transmits serial bits from the HIC to the PIC while the other set transmits serial bits from the PIC to the HIC. For each cycle of the PCI clock, each bit channel of the interface channel transmits a packet of serial bits.*

Figure 11:
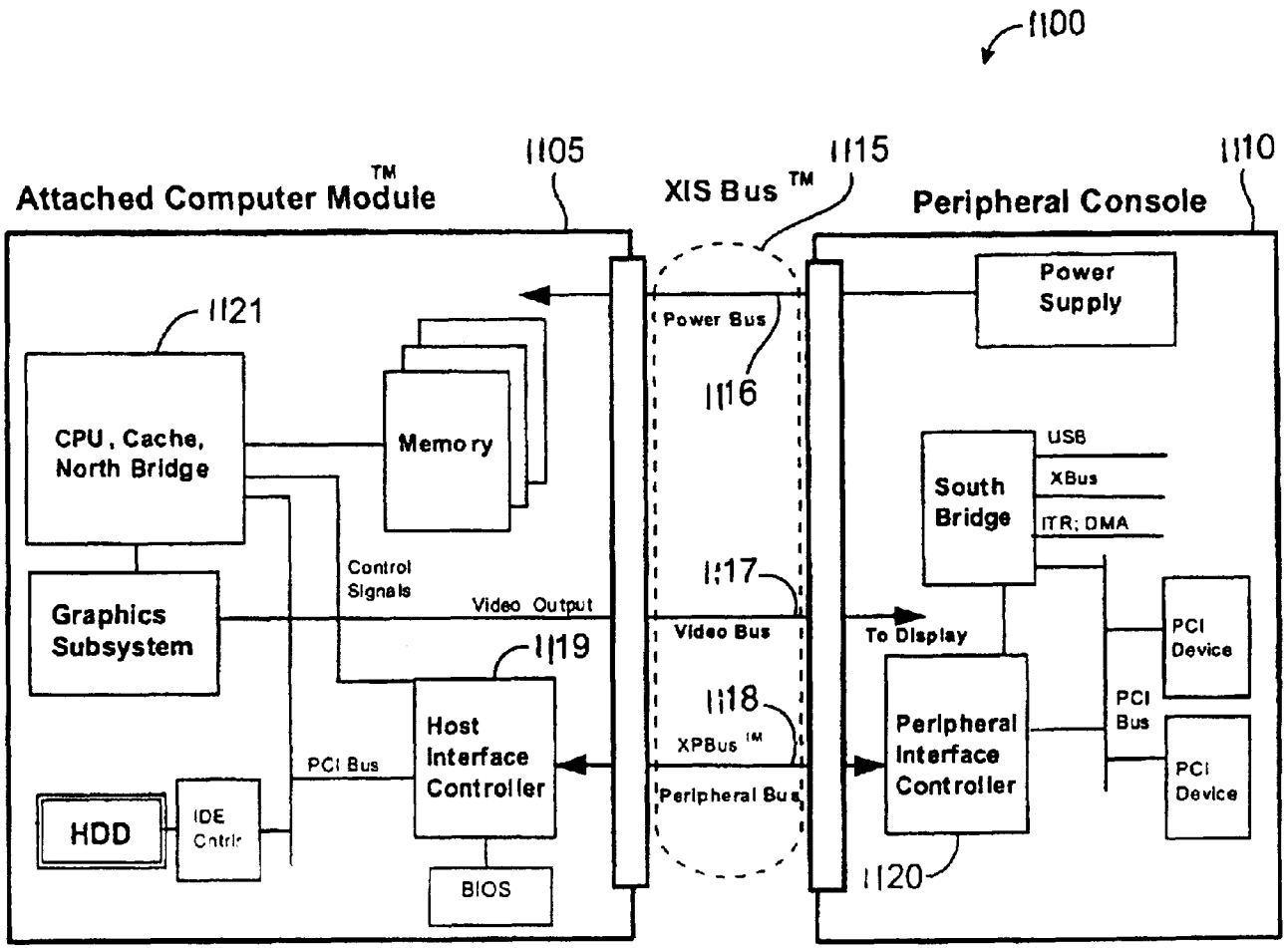
*FIG. 11 is a block diagram of one embodiment of a computer system using the interface of the present invention.*

*FIG. 11 is a block diagram of one embodiment of a computer system 1100 using the interface of the present invention. Computer system 1100 includes an attached computer module (ACM) 1105 and a peripheral console 1110. The ACM 1105 and the peripheral console 1110 are interfaced through an exchange interface system (XIS) bus 1115. The XIS bus 1115 includes power bus 1116, video bus 1117 and peripheral bus (XPBus) 1118, which is also herein referred to as an interface channel. The power bus 1116 transmits power between ACM 1105 and peripheral console 1110. In a preferred embodiment power bus 1116 transmits power at voltage levels of 3.3 volts, 5 volts and 12 volts. Video bus 1117 transmits video signals between the ACM 1105 and the peripheral console 1110. In a preferred embodiment, the video bus 1117 transmits analog Red Green Blue (RGB) video signals for color monitors, digital video signals (such as Video Electronics Standards Association (VESA) Plug and Display's Transition Minimized Differential Signaling (TMDS) signals for flat panel displays), and television (TV) and/or super video (S-video) signals. The XPBus 1118 is coupled to host interface controller (HIC) 1119 and to peripheral interface controller (PIC) 1120, which is also sometimes referred to as a bay interface controller.*

Figure 12:
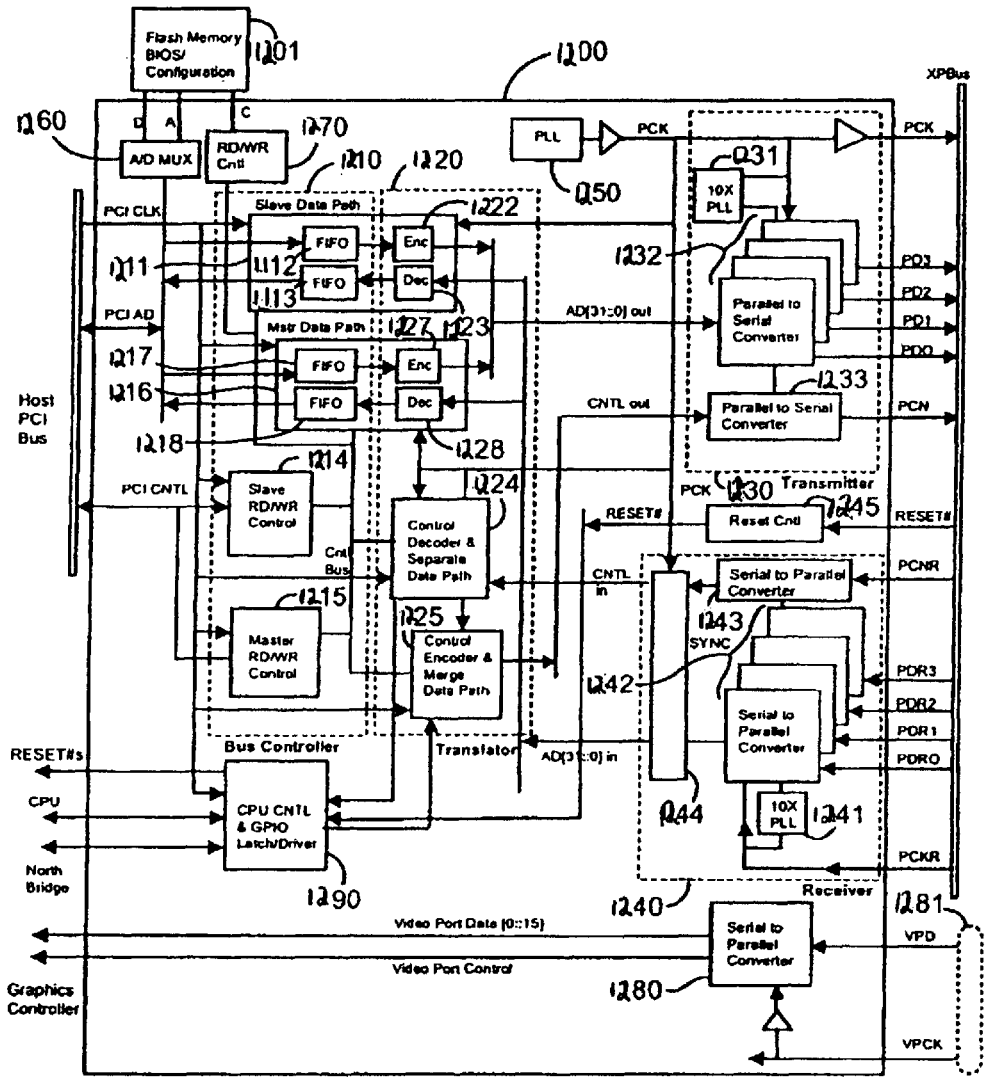
*FIG. 12 is a detailed block diagram of one embodiment of the host interface controller (HIC) of the present invention.*

*FIG. 12 is a detailed block diagram of one embodiment of the host interface controller (HIC) of the present invention. As shown in FIG. 12, HIC 1200 comprises bus controller 1210, translator 1220, transmitter 1230, receiver 1240, a PLL 1250, an address/data multiplexer (A/D MUX) 1260, a read/write controller (RD/WR Cntl) 1270, a video serial to parallel converter 1280 and a CPU control & general purpose input/output latch/driver (CPU CNTL & GPIO latch/driver) 1290.*

*HIC 1200 is coupled to an optional flash memory BIOS configuration unit 1201. Flash memory unit 1201 stores basic input output system (BIOS) and PCI configuration information and supplies the BIOS and PCI configuration information to A/D MUX 1260 and RD/WR Control 1270, which control the programming, read, and write of flash memory unit 1201.*

*Bus controller 1210 is coupled to the host PCI bus, which is also referred to herein as the primary PCI bus, and manages PCI bus transactions on the host PCI bus. Bus controller 1210 includes a slave (target) unit 1211 and a master unit 1216. Both slave unit 1211 and master unit 1216 each include two first in first out (FIFO) buffers, which are preferably asynchronous with respect to each other since the input and output of the two FIFOs in the master unit 1216 as well as the two FIFOs in the slave unit 1211 are clocked by different clocks, namely the PCI clock and the PCK. Additionally, salve unit 1211 includes encoder 1222 and decoder 1223, while master unit 1216 includes encoder*

*1227 and decoder 1228. The FIFOs 1212, 1213, 1217 and 1218 manage data transfers between the host PCI bus and the XPBus, which in the embodiment shown in FIG. 12 operate at 33 MHz and 66 MHz, respectively. PCI address/data (AD) from the host PCI bus is entered into FIFOs 1212 and 1217 before they are encoded by encoders 1222 and 1223. Encoders 1222 and 1223 format the PCI address/data bits to a form more suitable for parallel to serial conversion prior to transmittal on the XPBus. Similarly, address and data information from the receivers is decoded by decoders 1223 and 1228 to a form more suitable for transmission on the host PCI bus. Thereafter the decoded data and address information is passed through FIFOs 1213 and 1218 prior to being transferred to the host PCI bus. FIFOs 1212, 1213, 1217 and 1218, allow bus controller 1210 to handle posted and delayed PCI transactions and to provide deep buffering to store PCI transactions.*

*Bus controller 1210 also comprises slave read/write control (RD/WR Cntl) 1214 and master read/write control (RD/WR Cntl) 1215. RD/WR controls 1214 and 1215 are involved in the transfer of PCI control signals between bus controller 1210 and the host PCI bus.*

*Bus controller 1210 is coupled to translator 1220. Translator 1220 comprises encoders 1222 and 1227, decoders 1223 and 1228, control decoder & separate data path unit 1224 and control encoder & merge data path unit 1225. As discussed above encoders 1222 and 1227 are part of slave data unit 1211 and master data unit 1216, respectively, receive PCI address and data information from FIFOs 1212 and 1217, respectively, and encode the PCI address and data information into a form more suitable for parallel to serial conversion prior to transmittal on the XPBus. Similarly, decoders 1223 and 1228 are part of slave data unit 1211 and master data unit 1216, respectively, and format address and data information from receiver 1240 into a form more suitable for transmission on the host PCI bus. Control encoder & merge data path unit 1225 receives PCI control signals from the slave RD/WR control 1214 and master RD/WR control 1215. Additionally, control encoder & merge data path unit 1225 receives control signals from CPU CNTL & GPIO latch/driver 1290, which is coupled to the CPU and north bridge (not shown in FIG. 12). Control encoder & merge data path unit 1225 encodes PCI control signals as well as CPU control signals and north bridge signals into control bits, merges these encoded control bits and transmits the merged control bits to transmitter 1230, which then transmits the control bits on the data lines PD0 to PD3 and control line PCN of the XPBus. Examples of control signals include PCI control signals and CPU control signals. A specific example of a control signal is FRAME# used in PCI buses. A control bit, on the other hand is a data bit that represents a control signal. Control decoder & separate data path unit 1224 receives control bits from receiver 1240 which receives control bits on data lines PDR0 to PDR3 and control line PCNR of the XPBus. Control decoder & separate data path unit 1224 separates the control bits it receives from receiver 1240 into PCI control signals, CPU control signals and north bridge signals, and decodes the control bits into PCI control signals, CPU control signals, and north bridge signals all of which meet the relevant timing constraints.*

*Transmitter 1230 receives multiplexed parallel address/data (A/D) bits and control bits from translator 1220 on the AD[31::0] out and the CNTL out lines, respectively. Transmitter 1230 also receives a clock signal from PLL 1250. PLL 1250 takes a reference input clock and generates PCK that drives the XPBus. PCK is asynchronous with the PCI clock signal and operates at 66 MHz, twice the speed of the PCI clock of 33 MHz. The higher speed is intended to accommodate at least some possible increases in the operating speed of future PCI buses. As a result of the higher speed, the XPBus may be used to interface two PCI or PCI-like buses operating at 66 MHz rather than 33 MHz or having 64 rather than 32 multiplexed address/data lines.*

*The multiplexed parallel A/D bits and some control bits input to transmitter 1230 are serialized by parallel to serial converters 1232 to transmitter 1230 into 10 bit packets. These bit packets are then output on data lines PD0 to PD3 of the XPBus. Other control bits are serialized by parallel to serial converter 1233 into 10 bit packets and send out on control line PCN of the XPBus.*

*The XPBus lines, PD0 to PD3, PCN, PDR0 to PDR3 and PCNR, and the video data and clock lines, VPD and VPCK, are not limited to being LVDS lines, as they may be other forms of bit based lines. For example, in another embodiment, the XPBus lines may be IEEE 1394 lines.*

*It is to be noted that although each of the lines PCK, PD0 to PD3, PCN, PCKR, PDR0 to PDR3, PCNR, VPCK, and VPD is referred to as a line, in the singular rather than plural, each such line may contain more than one physical line. For example, in the embodiment shown in FIG. 14, each of lines PCK, PD0 to PD3 and PCN includes two physical lines between each driver and its corresponding receiver. The term line, when not directly preceded by the terms physical or conductive, is herein used interchangeably with a signal or bit channel which may consist of one or more physical lines for transmitting a signal. In the case of non-differential signal lines, generally only one physical line is used to transmit one signal. However, in the case of differential signal lines, a pair of physical lines is used to transmit one signal. For example, a bit line or bit channel in an LVDS or IEEE 1394 interface consists of a pair of physical lines which together transmit a signal.*

*A bit based line (i.e., a bit line) is a line for transmitting serial bits. Bit based lines typically transmit bit packets and use a serial data packet protocol. Examples of bit lines include an LVDS line, an IEEE 1394 line, and a Universal Serial Bus (USB) line.*

*It is to be noted that although each of the lines PCK, PD0 to PD3, PCN, PCKR, PDR0 to PDR3, PCNR, VPCK, and VPD is referred to as a line, in the singular rather than plural, each such line may contain more than one physical line. For example, in the embodiment of FIG. 14, each of lines PCK, PD0 to PD3 and PCN includes two physical lines between each driver and its corresponding receiver. The term line, when not directly preceded by the terms physical or conductive, is herein used interchangeably with a signal or bit channel which may consist of one or more physical lines for transmitting a signal. In the case of non-differential signal lines, generally only one physical line is used to transmit one signal. However, in the case of differential signal lines, a pair of physical lines is used to transmit one signal. For example, a bit line or bit channel in an LVDS or IEEE 1394 interface consists of a pair of physical lines which together transmit a signal.*

Figure 13:
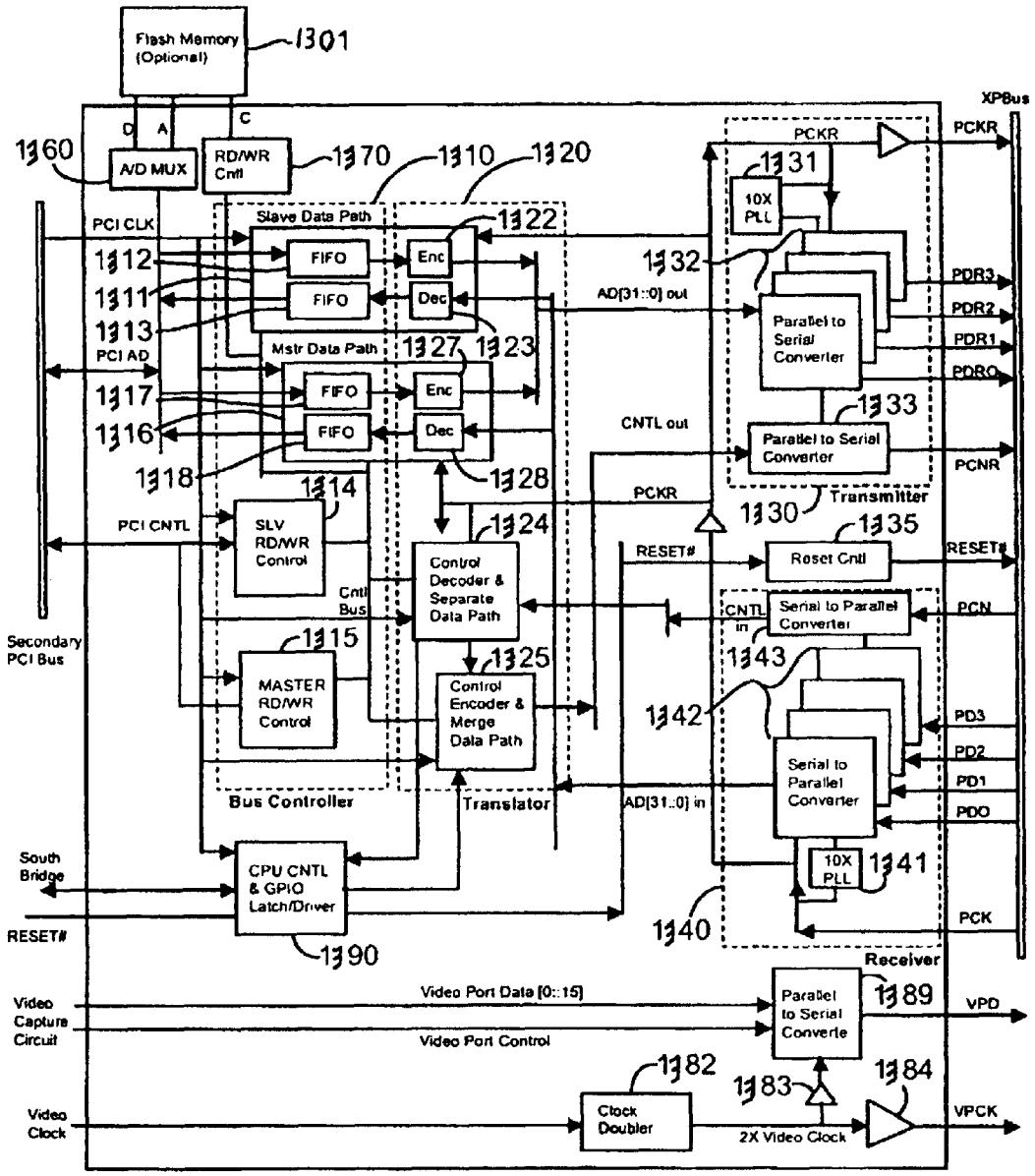
*FIG. 13 is a detailed block diagram of one embodiment of the PIC of the present invention.*

*FIG. 13 is a detailed block diagram of one embodiment of the PIC of the present invention, PIC 1300 is nearly identical to HIC 1200 in its function, except that HIC 1200 interfaces the host PCI bus to the XPBus while PIC 1300 interfaces the secondary PCI bus to the XPBus. Similarly, the components in PIC 1300 serve the same function as their corresponding components in HIC 1200. Reference numbers for components in PIC 1300 have been selected such that a component in PIC 1300 and its corresponding component in HIC 1200*

*have reference numbers that differ by 100 and have the same two least significant digits. Thus for example, the bus controller in PIC 1300 is referenced as bus controller 1310 while the bus controller in HIC 1200 is referenced as bus controller 1210. As many of the elements in PIC 1300 serve the same functions as those served by their corresponding elements in HIC 1200 and as the functions of the corresponding elements in HIC 1200 have been described in detail above, the function of elements of PIC 1300 having corresponding elements in HIC 1200 will not be further described herein. Reference may be made to the above description of FIG. 12 for an understanding of the functions of the elements of PIC 1300 having corresponding elements in HIC 1200.*

*As suggested above, there are also differences between HIC 1200 and PIC 1300. Some of the differences between HIC 1200 and PIC 1300 include the following. First, receiver 1340 in PIC 1300, unlike receiver 1240 in HIC 1200, does not contain a synchronization unit. As mentioned above, the synchronization unit in HIC 1200 synchronizes the PCKR clock to the PCK clock locally generated by PLL 1250. PIC 1300 does not locally generate a PCK clock and therefore, it does not have a locally generated PCK clock with which to synchronize the PCK clock signal that it receives from HIC 1200. Another difference between PIC 1300 and HIC 1200 is the fact that PIC 1300 contains a video parallel to serial converter 1389 whereas HIC 1200 contains a video serial to parallel converter 1280. Video parallel to serial converter 1389 receives 16 bit parallel video capture data and video control signals on the Video Port Data [0::15] and Video Port Control lines, respectively, from the video capture circuit (not shown in FIG. 11) and converts them to a serial video data stream that is transmitted on the VPD line to the HIC. The video capture circuit may be any type of video capture circuit that outputs a 16 bit parallel video capture data and video control signals. Another difference lies in the fact that PIC 1300, unlike HIC 1200, contains a clock doubler 1382 to double the video clock rate of the video clock signal that it receives. The doubled video clock rate is fed into video parallel to serial converter 1382 through buffer 1383 and is sent to serial to parallel converter 1280 through buffer 1384. Additionally, reset control unit 1335 in PIC 1300 receives a reset signal from the CPU CNTL & GPIO latch/driver unit 13190 and transmits the reset signal on the RESET# line to the HIC 1200 whereas reset control unit 1245 of HIC 600 receives the reset signal and forwards it to its CPU CNTL & GPIO latch/driver unit 1290 because, in the above embodiment, the reset signal RESET# is unidirectionally sent from the PIC 1300 to the HIC 1200.*

*Like HIC 1200, PIC 1300 handles the PCI bus control signals and control bits from the XPBus representing PCI control signals in the following ways:*

1. *PIC 1300 buffers clocked control signals from the secondary PCI bus, encodes them and sends the encoded control bits to the XPBus;*
2. *PIC 1300 manages the signal locally; and*
3. *PIC 1300 receives control bits from XPBus, translates them into PCI control signals and sends the PCI control signals to the secondary PCI bus.*

*PIC 1300 also supports a reference arbiter on the secondary PCI Bus to manage the PCI signals REQ# and GNT#.*

*The XPBus which includes lines PCK, PD0 to PD3, PCN, PCKR, PDR0 to PDR3, and PCNR, has two sets of unidirectional lines transmitting clock signals and bits in opposite directions. The first set of unidirectional lines includes PCK, PD0 to PD3, and PCN. The second set of unidirectional lines includes PCKR, PDR0 to PDR3, and PCNR. Each of these unidirectional set of lines is a point-to-point bus with a fixed transmitter and receiver, or in other words a fixed master and slave bus. For the first set of unidirectional lines, the HIC is a fixed transmitter/master whereas the PIC is a fixed receiver/slave. For the second set of unidirectional lines, the PIC is a fixed transmitter/master whereas the HIC is a fixed receiver/slave. The LVDS lines of XPBus, a cable friendly and remote system I/O bus, transmit fixed length data packets within a clock cycle.*

Figure 14:
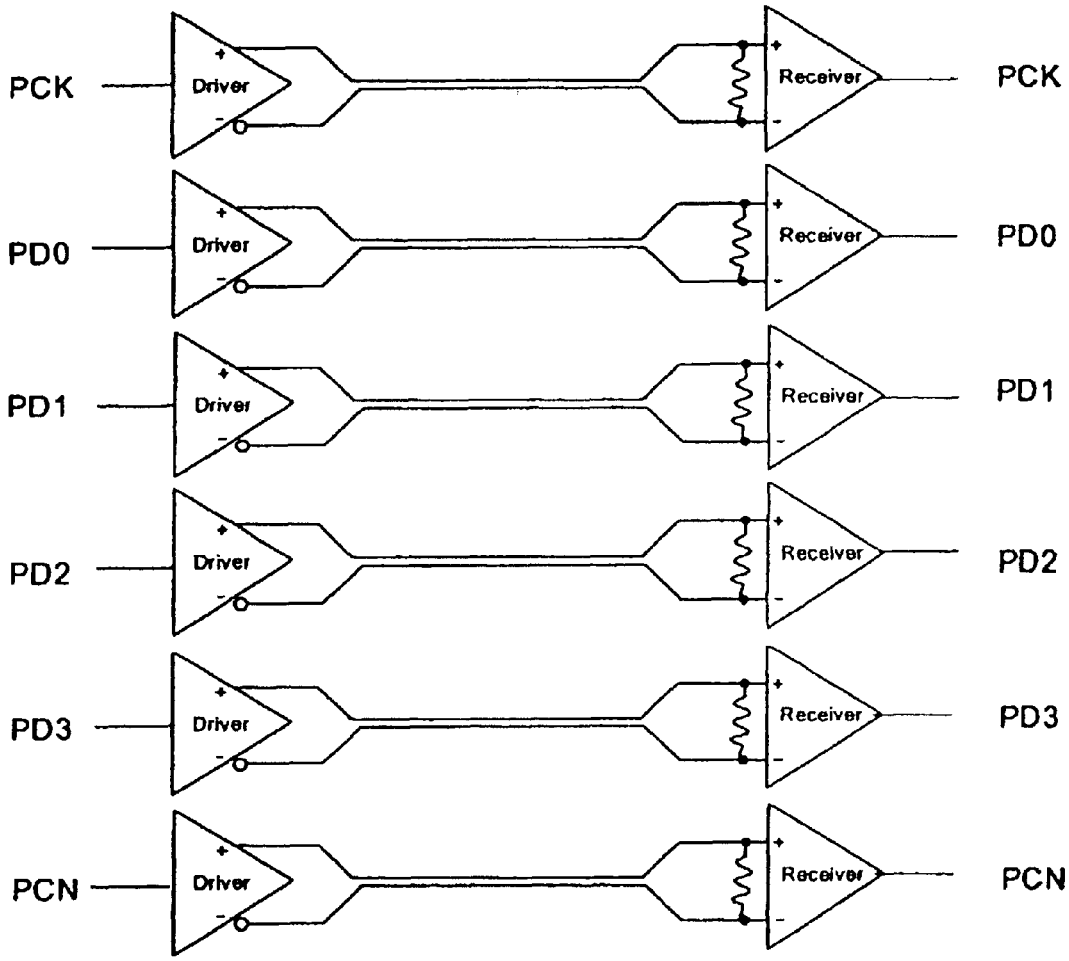
*FIG. 14 is a schematic diagram of the signal lines PCK, PD0 to PD3, and PCN.*

*FIG. 14 is a schematic diagram of lines PCK, PD0 to PD3, and PCN. These lines are unidirectional LVDS lines for transmitting clock signals and bits from the HIC to the PIC. The bits on the PD0 to PD3 and the PCN lines are sent synchronously within every clock cycle of the PCK. Another set of lines, namely PCKR, PDR0 to PDR3, and PCNR, are used to transmit clock signals and bits from the PIC to HIC. The lines used for transmitting information from the PIC to the HIC have the same structure as those shown in FIG. 14, except that they transmit data in a direction opposite to that in which the lines shown in FIG. 14 transmit data. In other words they transmit information from the PIC to the HIC. The bits on the PDR0 to PDR3 and the PCNR lines are sent synchronously within every clock cycle of the PCKR. Some of the examples of control information that may be sent in the reverse direction, i.e., on PCNR line, include a request to switch data bus direction because of a pending operation (such as read data available), a control signal change in the target requiring communication in the reverse direction, target busy, and transmission error detected.*

*The XPBus which includes lines PCK, PD0 to PD3, PCN, PCKR, PDR0 to PDR3, and PCNR, has two sets of unidirectional lines transmitting clock signals and bits in opposite directions. The first set of unidirectional lines includes PCK, PD0 to PD3, and PCN. The second set of unidirectional lines includes PCKR, PDR0 to PDR3, and PCNR. Each of these unidirectional set of lines is a point-to-point bus with a fixed transmitter and receiver, or in other words a fixed master and slave bus. For the first set of unidirectional lines, the HIC is a fixed transmitter/master whereas the PIC is a fixed receiver/slave. For the second set of unidirectional lines, the PIC is a fixed transmitter/master whereas the HIC is a fixed receiver/slave. The LVDS lines of XPBus, a cable friendly and remote system I/O bus, transmit fixed length data packets within a clock cycle.*

Figure 15:
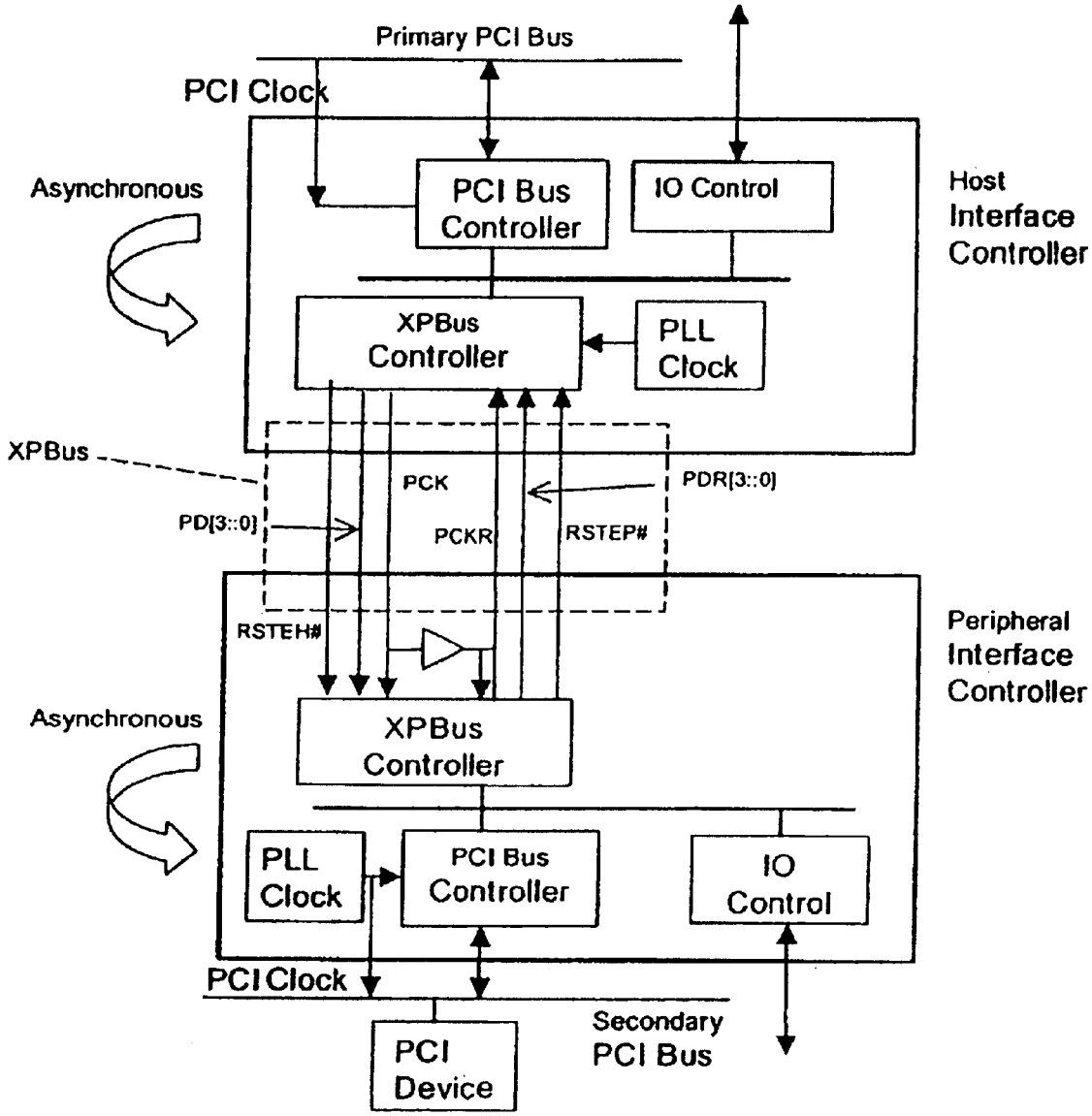
*FIG. 15 is a block diagram of another embodiment of the HIC and PIC of the present invention and the interface therebetween.*
Figure 1B:
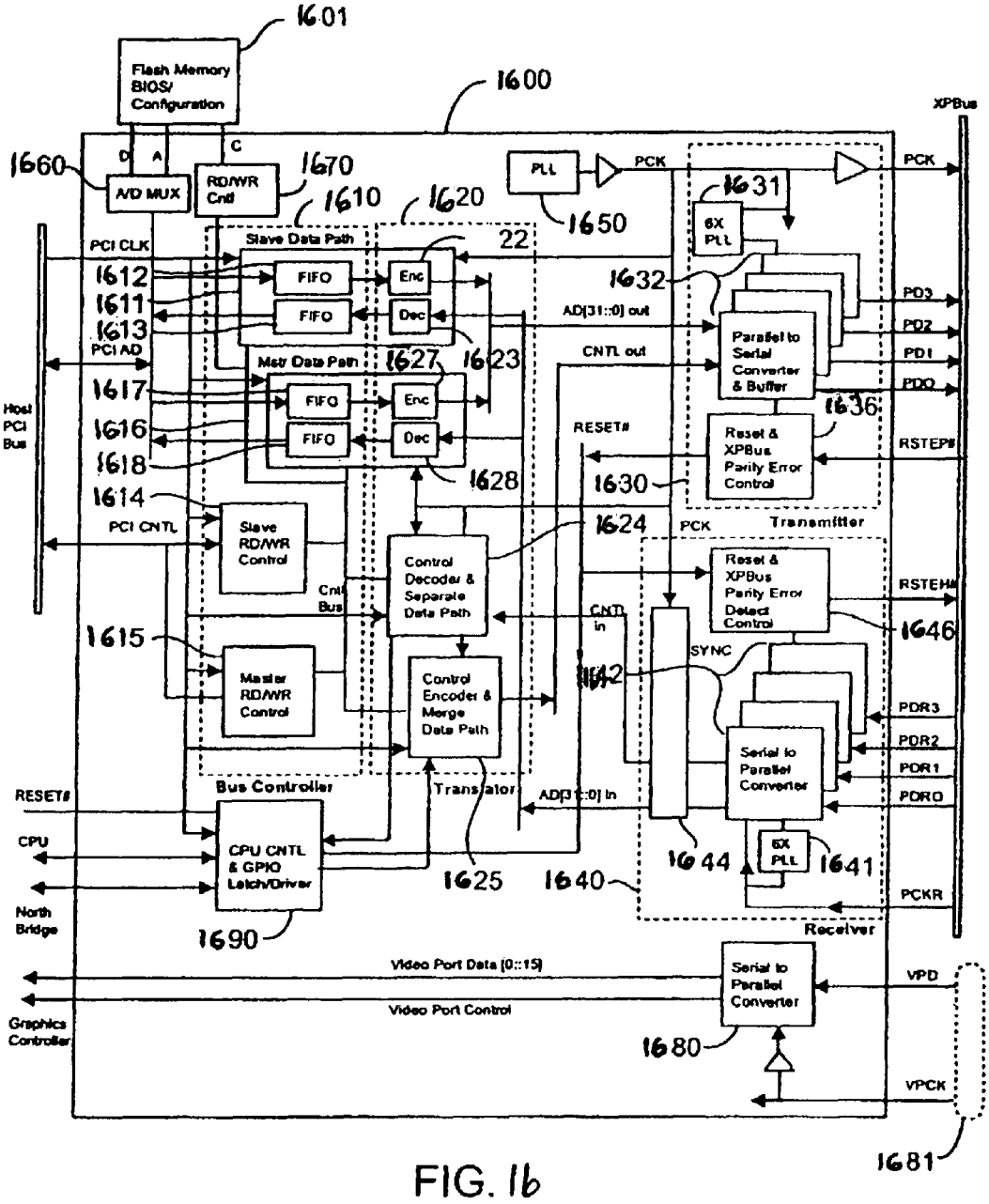

*FIG. 15 is a block diagram of another embodiment of the HIC and PIC of the present invention and the interface therebetween.*

*FIG. 16 shows detailed block diagrams of the HIC shown in FIG. 15. HIC 1600 shown in FIG. 16 is, other than for a few difference, identical to HIC 1200 shown in FIG. 12. Accordingly, reference numbers for components in HIC 1600 have been selected such that a component in HIC 1600 and its corresponding component in HIC 1200 have reference numbers that differ by 400 and have the same two least significant digits. One of the differences between HIC 1600 and HIC 1200 is the fact that, unlike HIC 1200, HIC 1600 does not have a parallel to serial converter or a serial to parallel converter dedicated exclusively to CNTL out and CNTL in signals, respectively. This is due to the fact that XPBus for HIC 1600 does not contain a PCN or PCNR line. Another important difference between HIC 1600 and HIC 1200 is the fact that HIC 1600, unlike HIC 1200, has two reset lines, RSTEP# and RSTEH#, instead of only one reset line. Rest line RSTEP# is coupled to Reset & XPBus Parity Error Control Unit 1636 which receives, on the reset line RSTEP#, a reset signal and a parity error signal generated*

*by the PIC, sends a reset signal to the CPU CNTL & GPIO latch/driver 1690, and controls retransmission of bits from the parallel to serial converters 1632. Reset & XPBus Parity Error Detection and Control Unit 1646 takes bits from serial to parallel converters 1642, performs a parity check to detect any transmission error, and sends reset and parity error signals to the PIC on the reset line RSTEH#. The reset and parity error signals may be distinguished by different signal patterns and/or different signal durations. In the two reset line system, the reset and error parity signals are transmitted on the same line and it is possible to send a parity error confirmation signal on one line while receiving a reset signal on the other line. Because HIC 1600 provides for parity error detection, the parallel to serial converters 1632 include buffers. The buffers in parallel to serial converters 1632 store previously transmitted bits (e.g., those transmitted within the previous two clock cycles) for retransmission if transmission error is detected and a parity error signal is received on line RSTEP#. It is to be noted that parallel to serial converters 1232 do not contain buffers such as those contained in parallel to serial converters 1632 for purposes of retransmission since HIC 1200 does not provide for parity error signal detection. Yet another difference between HIC 1200 and HIC 1600 is the fact that in HIC 1600 clock multipliers 1631 and 1641 multiply the PCK and PCKR clocks, respectively, by a factor of 6 rather than 10 because the XPBus coupled to HIC 1600 transmits six bit packets instead of ten bit packets during each XPBus clock cycle. Sending a smaller number of bits per XPBus clock cycle provides the benefit of improving synchronization between the data latching clock output by clock multipliers 1631 and 1641 and the XPBus clocks, PCK and PCKR. In another embodiment, one may send 5 or some other number of bits per XPBus clock cycle. As mentioned above, the remaining elements in HIC 1600 are identical to those in HIC 1200 and reference to the description of the elements in HIC 1200 may be made to understand the function of the corresponding elements in HIC 1600.*

Figure 17:
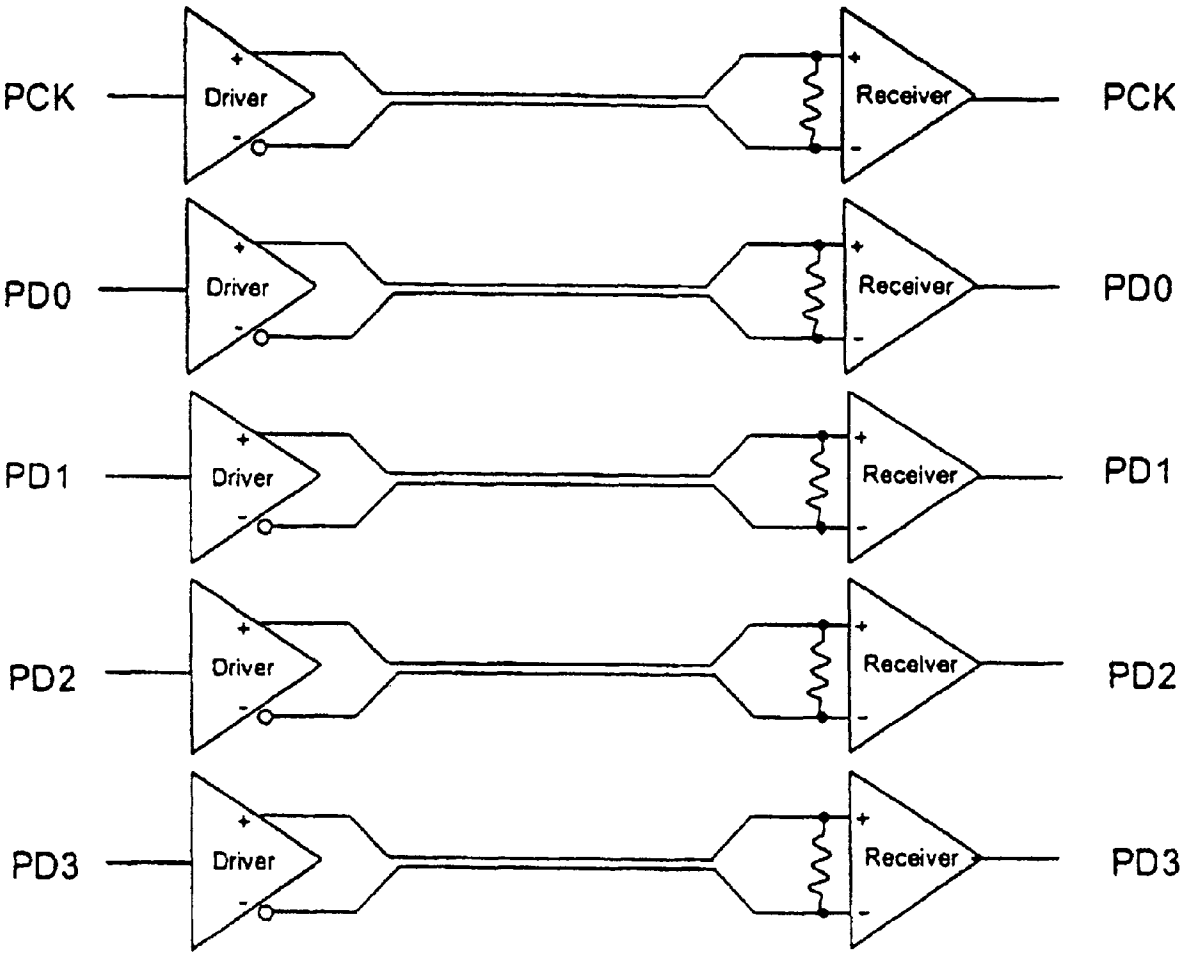
*FIG. 17 is a schematic diagram of the signal lines PCK and PD0 to PD3.*

*FIG. 17 is a schematic diagram of the lines PCK and PD0 to PD3. These lines are unidirectional LVDS lines for transmitting signals from HIC 1600 to the PIC of FIG. 15. Another set of lines, namely PCKR and PDR0 to PDR3, are used to transmit clock signals and bits from the PIC to HIC 1600.*

The above embodiments are described generally in terms of hardware and software. It will be recognized, however, that the functionality of the hardware can be further combined or even separated. The functionality of the software can also be further combined or even separated. Hardware can be replaced, at times, with software. Software can be replaced, at times, with hardware. Accordingly, the present embodiments should not be construed as limiting the scope of the claims here. One of ordinary skill in the art would recognize other variations, modifications, and alternatives.

While the above is a full description of the specific embodiments, various modifications, alternative constructions and equivalents may be used. Therefore, the above description and illustrations should not be taken as limiting the scope of the present invention which is defined by the appended claims.

What is claimed is:

[1. A computer module, said module comprising:

an enclosure, said enclosure being insertable into a console;

a central processing unit in said enclosure, said central processing unit comprising a microprocessor based integrated circuit chip;

a hard disk drive in said enclosure, said hard disk drive being coupled to said central processing unit; and a programmable memory device in said enclosure, said programmable memory device being configurable to store a password for preventing a possibility of unauthorized use of said hard disk drive.]

[2. The computer module of claim 1 further comprising a host interface controller for providing a status of a locking device in said enclosure.]

[3. The computer module of claim 1 further comprising a mechanical locking device that is coupled to said programmable memory device.]

[4. The computer module of claim 1 further comprising a host interface controller coupled to a mechanical locking device, said host interface controller being coupled to said programmable memory device.]

[5. The computer module of claim 1 wherein said programmable memory device comprises a flash memory device.]

[6. The computer module of claim 1 wherein said programmable memory device comprises a flash memory device having at least 8 Mbits of cells and greater.]

[7. The computer module of claim 1 further comprising a security program in a main memory.]

[8. The computer module of claim 7 wherein said security program comprises a code for storing a password on said programmable memory device.]

[9. The computer module of claim 8 wherein said security program comprises a code for checking a time from said real-time clock circuit.]

[10. The computer module of claim 1 further comprising a host interface controller coupled to a solenoid that drives a mechanical lock in a first position to a second position.]

[11. The computer module of claim 10 wherein said solenoid also drives said mechanical lock from said second position to said first position.]

[12. The computer module of claim 1 further comprising a real-time clock circuit coupled to said central processing unit.]

[13. The computer module of claim 12 further comprising a battery coupled to a host interface controller that includes said real-time clock.]

[14. A method for operating a computer system, said method comprising:

inserting an attached computer module ("ACM") into a bay of a modular computer system, said ACM comprising a microprocessor unit coupled to a mass memory storage device;

applying power to said computer system and said ACM to execute a security program, said security program being stored in said mass memory storage device; and prompting for a user password from a user on a display.]

[15. The method of claim 14 wherein said ACM comprises an enclosure that houses said microprocessor unit and said mass memory storage device.]

[16. The method of claim 14 further comprising providing a user password to said security program.]

[17. The method of claim 14 further comprising a flash memory device for storing a desired password for said ACM.]

[18. The method of claim 17 wherein said flash memory device maintains said desired password when power is removed from said ACM.]

[19. The method of claim 18 wherein said flash memory device is coupled to a host interface controller that is coupled to said microprocessor based unit.]

[20. The method of claim 14 wherein said mass memory storage device comprises a code directed to comparing said user password with a desired password.]

[21. The method of claim 14 further comprising identifying a permanent password or user code on said attached computer module.]

[22. The method of claim 21 wherein said permanent password or user code is stored in said microprocessor unit.]

[23. The method of claim 21 wherein said permanent password or user code is stored in a flash memory device coupled to said microprocessor unit.]

*24. A computer module operational upon insertion into a console comprising a primary power supply and an integrated LCD display screen, said computer module comprising:*

*an enclosure;*

*a central processing unit in said enclosure, said central processing unit comprising a microprocessor based integrated circuit chip;*

*a low voltage differential signal (LVDS) channel comprising two sets of unidirectional serial bit channels which transmit an encoded serial bit stream of a Peripheral Component Interconnect (PCI) bus transaction in opposite directions;*

*an interface controller coupled to the LVDS channel;*

*a hard disk drive in said enclosure, said hard disk drive being coupled to said central processing unit; and*

*a programmable memory device in said enclosure, said programmable memory device being configurable to store a password for preventing a possibility of unauthorized use of said hard disk drive;*

*wherein the computer module can only operate at a rated speed for more than a fraction of an hour when inserted into the console to receive power from the primary power supply; and wherein the computer module couples to a primary display device through the console.*

*25. The computer module of claim 24 wherein the module is configured to receive power from the primary power supply as an AC to DC power supply.*

*26. The computer module of claim 24 wherein the computer module further couples to a removable media drive through the console.*

*27. A computer module operational upon insertion into a console comprising a primary power supply and a LAN communication device, said computer module comprising:*

*an enclosure;*

*a central processing unit in said enclosure, said central processing unit comprising a microprocessor based integrated circuit chip;*

*a low voltage differential signal (LVDS) channel comprising two sets of unidirectional serial bit channels which transmit an encoded serial bit stream of a Peripheral Component Interconnect (PCI) bus transaction in opposite directions;*

*an interface controller coupled to the LVDS channel;*

*a hard disk drive in said enclosure, said hard disk drive being coupled to said central processing unit; and*

*a programmable memory device in said enclosure, said programmable memory device being configurable to store a password for preventing a possibility of unauthorized use of said hard disk drive;*

*wherein the computer module can only operate at a rated speed of the central processing unit for more than a fraction of an hour when inserted into the console to receive power from the primary power supply; and wherein the computer module communicates to any external LAN network through the console.*

*28. The computer module of claim 27 wherein the computer module couples to a removable media drive through the console.*

*29. A computer module operational upon insertion into a console comprising a primary power supply and an interface controller, said computer module comprising:*

*a rectangular enclosure;*

*a central processing unit in said rectangular enclosure, said central processing unit comprising a microprocessor based integrated circuit chip;*

*a low voltage differential signal (LVDS) channel comprising two sets of unidirectional serial channels which transmit an encoded serial bit stream of a Peripheral Component Interconnect (PCI) bus transaction in opposite directions;*

*a hard disk drive in said rectangular enclosure, said hard disk drive being coupled to said central processing unit; and*

*a programmable memory device in said rectangular enclosure, said programmable memory device being configurable to store a password for preventing a possibility of unauthorized use of said hard disk drive;*

*wherein the computer module can only operate at a rated speed of the central processing unit for more than a fraction of an hour when inserted into the console to receive power from the primary power supply; and wherein the computer module couples to a removable media drive through the console.*

*30. The computer module of claim 29 wherein the computer module couples to a primary display device through the console.*

*31. The computer module of claim 29 wherein the computer module couples to a primary input device through the console.*

*32. A computer module operational upon insertion into a console comprising a primary power supply and a connector for an add-on circuit card, and an integrated LCD display, said computer module comprising:*

*a rectangular enclosure;*

*a central processing unit in said rectangular enclosure, said central processing unit comprising a microprocessor based integrated circuit chip;*

*a low voltage differential signal (LVDS) channel comprising two sets of multiple unidirectional serial bit channels which transmit an encoded serial bit stream of a Peripheral Component Interconnect (PCI) bus transaction in opposite directions;*

*a hard disk drive in said rectangular enclosure, said hard disk drive being coupled to said central processing unit; and*

*a programmable memory device in said rectangular enclosure, said programmable memory device being configurable to store a password for preventing a possibility of unauthorized use of said hard disk drive;*

*wherein the computer module can only operate at a rated speed of the central processing unit for more than a fraction of an hour when inserted into the console to receive power from the primary power supply; wherein the LVDS channel couples to the connector for the add-on circuit card in the console; and wherein the computer module communicates to any external LAN network through the console.*

*33. The computer module of claim 32 wherein the computer module couples to a removable media drive through the console.*

*34. The computer module of claim 32 wherein the computer module couples to a primary display device through the console.*

*35. A computer module operational upon insertion into a console comprising a primary power supply and a first interface controller; said computer module comprising:*

*an enclosure;*

*a central processing unit in said enclosure, said central processing unit comprising a microprocessor based integrated circuit chip;*

*a low voltage differential signal (LVDS) channel comprising two sets of unidirectional serial bit channels which transmit an encoded serial bit stream of a Peripheral Component Interconnect (PCI) bus transaction in opposite directions;*

*a second interface controller coupled to the LVDS channel;*

*a hard disk drive in said enclosure, said hard disk drive being coupled to said central processing unit; and*

*a programmable memory device in said enclosure, said programmable memory device being configurable to store a password for preventing a possibility of unauthorized use of said hard disk drive;*

*wherein the computer module can only operate at a rated speed of the central processing unit for more than a fraction of an hour when inserted into the console to receive power from the primary power supply; and wherein the first and second interface controllers couple to each other upon insertion; and wherein the computer module communicates to any external LAN network through the console.*

*36. The computer module of claim 35 wherein the computer module is couples to a primary input device through the console.*

*37. A method for forming an operational computer system, said method comprising:*

*inserting an attached computer module ("ACM") into a bay of a modular computer system housed in a console with a primary power supply wherein the ACM is operational upon insertion into the console and receiving power from the primary power supply,*

*said ACM comprising a microprocessor unit coupled to a mass memory storage device;*

*applying power to said modular computer system and said ACM to execute a security program, said security program being stored in said mass memory storage device;*

*coupling to a primary display device through the console;*

*communicating an encoded serial bit stream of a Peripheral Component Interconnect (PCI) bus transaction to a low voltage differential signal (LVDS) channel in the console comprising two sets of multiple unidirectional serial bit channels which transmit data in opposite directions; and*

*prompting for a user password from a user on said primary display device through the console.*

*38. The method of claim 37 wherein said security program is configured to manage a user's privilege to access data based on said password.*

*39. A method for forming an operational computer system, said method comprising:*

*inserting an attached computer module ("ACM") into a bay of a modular computer system housed in a console comprising a primary power supply, and an integrated LCD display device, wherein the ACM is operational upon insertion into the console and receiving power from the primary power supply,*

*said ACM comprising a microprocessor unit coupled to a mass memory storage device;*

*applying power to said modular computer system and said ACM to execute a security program, said security program being stored in said mass memory storage device;*

*coupling to a primary display device through the console;*

*communicating an encoded serial bit stream of a Peripheral Component Interconnect (PCI) bus transaction to a low voltage differential signal (LVDS) channel in the console comprising two sets of multiple unidirectional serial bit channels which transmit data in opposite directions; and*

*prompting for a user password from a user on said primary display device through the console.*

*40. The method of claim 39 wherein said security program manages a user's privilege to access data based on said password.*

*41. A method for forming an operational computer system, said method comprising:*

*inserting an attached computer module ("ACM") into a bay of a modular computer system housed in a console with a LAN communication device and a primary power supply, wherein the ACM is operational upon insertion into the console and receiving power from the primary power supply,*

*said ACM comprising a microprocessor unit coupled to a mass memory storage device, and a memory device used to store configuration data;*

*applying power to said modular computer system and said ACM to execute a security program, said security program being stored in said mass memory storage device;*

*communicating an encoded serial bit stream of a Peripheral Component Interconnect (PCI) bus transaction to a low voltage differential signal (LVDS) channel in the console comprising two sets of multiple unidirectional serial bit channels which transmit data in opposite directions; and*

*prompting for a user password from a user on a display.*

*42. The method of claim 41 further comprising facilitating an intelligent mating of the computer module to the console with the configuration data.*

*43. The method of claim 41 wherein said security program manages a user's privilege to access data based on said password.*

*44. A method for forming an operational computer system, said method comprising:*

*inserting an attached computer module ("ACM") into a bay of a modular computer system housed in a console comprising a primary power supply, wherein the ACM is operational upon insertion into the console and receiving power from the primary power supply,*

*said ACM comprising an interface controller and a microprocessor unit in an enclosure coupled to a mass memory storage device in said enclosure;*

*applying power to said modular computer system and said ACM executing a security program, said security program being stored in said mass memory storage device;*

*coupling to a primary display device through the console;*

*prompting for a user password from a user on said primary display device through the console;*

*communicating an encoded serial bit stream of a Peripheral Component Interconnect (PCI) bus transaction to a low voltage differential signal (LVDS) channel in the console comprising two sets of multiple unidirectional*

*serial bit channels which transmit data in opposite directions; and*

*communicating to the console for the ACM to access a removable media drive.*

*45. The method of claim 44 further comprising providing a user password to said security program to prevent unauthorized use of said mass memory storage device.*

*46. The method of claim 44 wherein said security program manages a user's privilege to access data based on said password.*

*47. A method for forming an operational computer system, said method comprising:*

*inserting an attached computer module ("ACM") into a bay of a modular computer system housed in a console comprising a universal serial bus (USB) and a primary power supply, wherein the ACM is operational upon insertion into the console and receiving power from the primary power supply,*

*said ACM comprising a microprocessor unit coupled to a mass memory storage device;*

*applying power to said modular computer system and said ACM to execute a security program, said security program being stored in said mass memory storage device;*

*prompting for a user password from a user on a display;*

*communicating an encoded serial bit stream of a Peripheral Component Interconnect (PCI) bus transaction to a low voltage differential (LVDS) channel in the console comprising two sets of multiple unidirectional serial bit channels which transmit data in opposite directions; and*

*communicating to the console as the way the ACM accesses a removable drive.*

*48. The method of claim 47 further comprising providing a user password to said security program to prevent unauthorized use of said mass memory storage device.*

*49. The method of claim 47 wherein said mass memory storage device comprises flash memory.*

*50. A method for forming an operational computer system, said method comprising:*

*inserting an attached computer module ("ACM") into a bay of a modular computer system housed in a console with a LAN communication device, a universal serial bus (USB) and a primary power supply, wherein the ACM is operational upon insertion into the console and receiving power from the primary power supply,*

*said ACM comprising a microprocessor unit coupled to a mass memory storage device;*

*applying power to said modular computer system and said ACM to execute a security program, said security program being stored in said mass memory storage device;*

*communicating data from the ACM to external LAN network through the console;*

*communicating an encoded serial bit stream of a Peripheral Component Interconnect (PCI) bus transaction to a low voltage differential (LVDS) channel in the console comprising two sets of multiple unidirectional serial bit channels which transmit data in opposite directions; and*

*prompting for a user password from a user on a display.*

*51. The method of claim 50 further comprising communicating to the console as the way the ACM accesses a removable media drive.*

*52. The method of claim 50 further comprising storing a desired password for said ACM in a flash memory device.*

*53. The method of claim 50 wherein said mass memory storage device comprises flash memory.*

*54. A method for forming an operational computer system, said method comprising:*

*inserting an attached computer module ("ACM") into a bay of a modular computer system housed in a console, said console comprises a universal serial bus (USB) and a primary power supply, wherein the ACM is operational upon insertion into the console and receiving power from the primary power supply,*

*said ACM comprising a microprocessor unit coupled to a mass memory storage device, and a memory device used to store configuration data;*

*applying power to said modular computer system and said ACM to execute a security program, said security program being stored in said mass memory storage device;*

*facilitating an intelligent mating of the computer module to the console with the configuration data;*

*coupling to the primary display device through the console;*

*communicating an encoded serial bit stream of a Peripheral Component Interconnect (PCI) bus transaction to a low voltage differential signal (LVDS) channel in the console comprising two sets of multiple unidirectional serial bit channels which transmit data in opposite directions; and*

*prompting for a user password from a user on said primary display device through the console.*

*55. The method of claim 54 wherein said mass memory storage device comprises flash memory.*

*56. The method of claim 54 further comprising communicating to the console as the way the ACM accesses a removable media drive.*

*57. A method for forming an operational computer system, said method comprising:*

*inserting an attached computer module ("ACM") into a bay of a modular computer system housed in a console, said console comprises an integrated LCD display and a primary power supply, wherein the ACM is operational upon insertion into the console and receiving power from the primary power supply,*

*said ACM comprising a rectangular enclosure, a microprocessor unit in said rectangular enclosure coupled to a mass memory storage device in said rectangular enclosure, and a memory device in said rectangular enclosure used to store configuration data;*

*applying power to said modular computer system and said ACM to execute a security program, said security program being stored in said mass memory storage device;*

*facilitating an intelligent mating of the computer module to the console with the configuration data;*

*coupling to a primary display device through the console;*

*communicating an encoded serial bit stream of a Peripheral Component Interconnect (PCI) bus transaction to a low voltage differential (LVDS) channel in the console comprising two sets of multiple unidirectional serial bit channels which transmit data in opposite directions; and*

*prompting for a user password from a user on said primary display device through the console.*

*58. The method of claim 57 wherein said mass memory storage device comprises flash memory.*

* * * * *